(12) United States Patent
Kumagai et al.

(10) Patent No.: US 11,811,994 B2
(45) Date of Patent: Nov. 7, 2023

(54) INFORMATION PROCESSING SYSTEM AND APPARATUS TO MANAGE COMBINED APPLICATION

(71) Applicant: CANON KABUSHIKI KAISHA, Tokyo (JP)

(72) Inventors: Sora Kumagai, Chiba (JP); Takeshi Kogure, Ibaraki (JP); Atsushi Ikeda, Ibaraki (JP); Hiroaki Koike, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/853,221

(22) Filed: Jun. 29, 2022

(65) Prior Publication Data

US 2023/0007137 A1 Jan. 5, 2023

(30) Foreign Application Priority Data

Jul. 2, 2021 (JP) .................................. 2021-110760

(51) Int. Cl.
*H04N 1/00* (2006.01)
*G06F 8/61* (2018.01)
*H04N 1/23* (2006.01)

(52) U.S. Cl.
CPC ......... *H04N 1/00949* (2013.01); *G06F 8/63* (2013.01); *H04N 1/00798* (2013.01); *H04N 1/2338* (2013.01)

(58) Field of Classification Search
None
See application file for complete search history.

(56) References Cited

U.S. PATENT DOCUMENTS

| 2010/0071045 | A1* | 3/2010 | Yoshizawa | H04L 63/08 726/8 |
| 2014/0037267 | A1* | 2/2014 | Yang | G11B 27/11 386/248 |
| 2016/0080479 | A1* | 3/2016 | Zhang | H04L 67/10 709/217 |

FOREIGN PATENT DOCUMENTS

| JP | H10111793 A | 4/1998 |
| JP | 2012256337 A | 12/2012 |
| JP | 2016002470 A | 1/2016 |

* cited by examiner

*Primary Examiner* — Lennin R Rodriguezgonzalez
(74) *Attorney, Agent, or Firm* — CANON U.S.A., INC. IP Division

(57) ABSTRACT

An information processing system that manages an application executed by an image processing apparatus with an application identifier includes one or more controllers configured to provide combined information of a reproduction application that reproduces a description file for defining operation procedures and a first description file as a first combined application, provide combined information of the reproduction application and a second description file as a second combined application, manage a first description identifier corresponding to the first description file and a second description identifier corresponding to the second description file, and manage the first combined application and the second combined application in a distinguishable manner based on the first description identifier and the second description identifier.

20 Claims, 19 Drawing Sheets

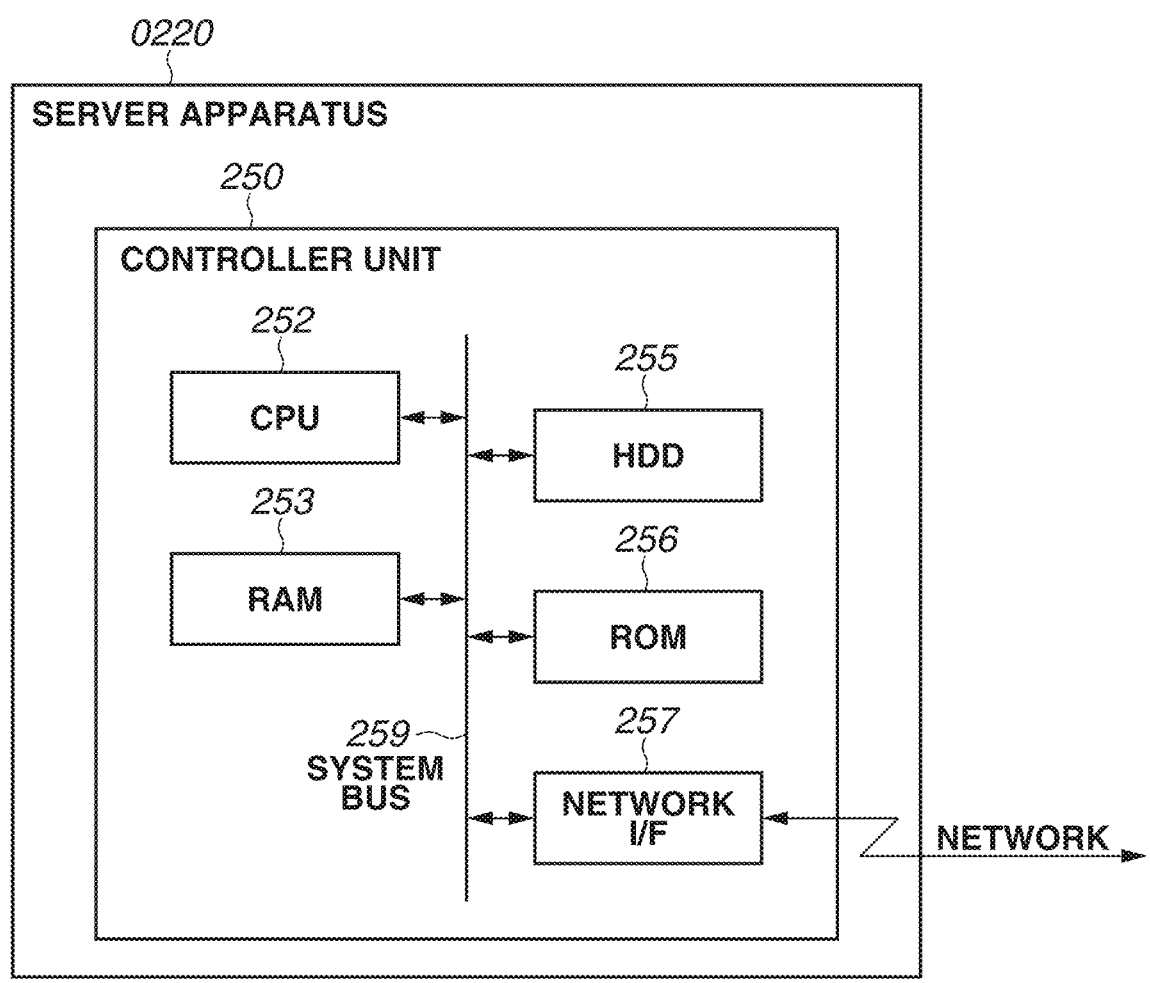

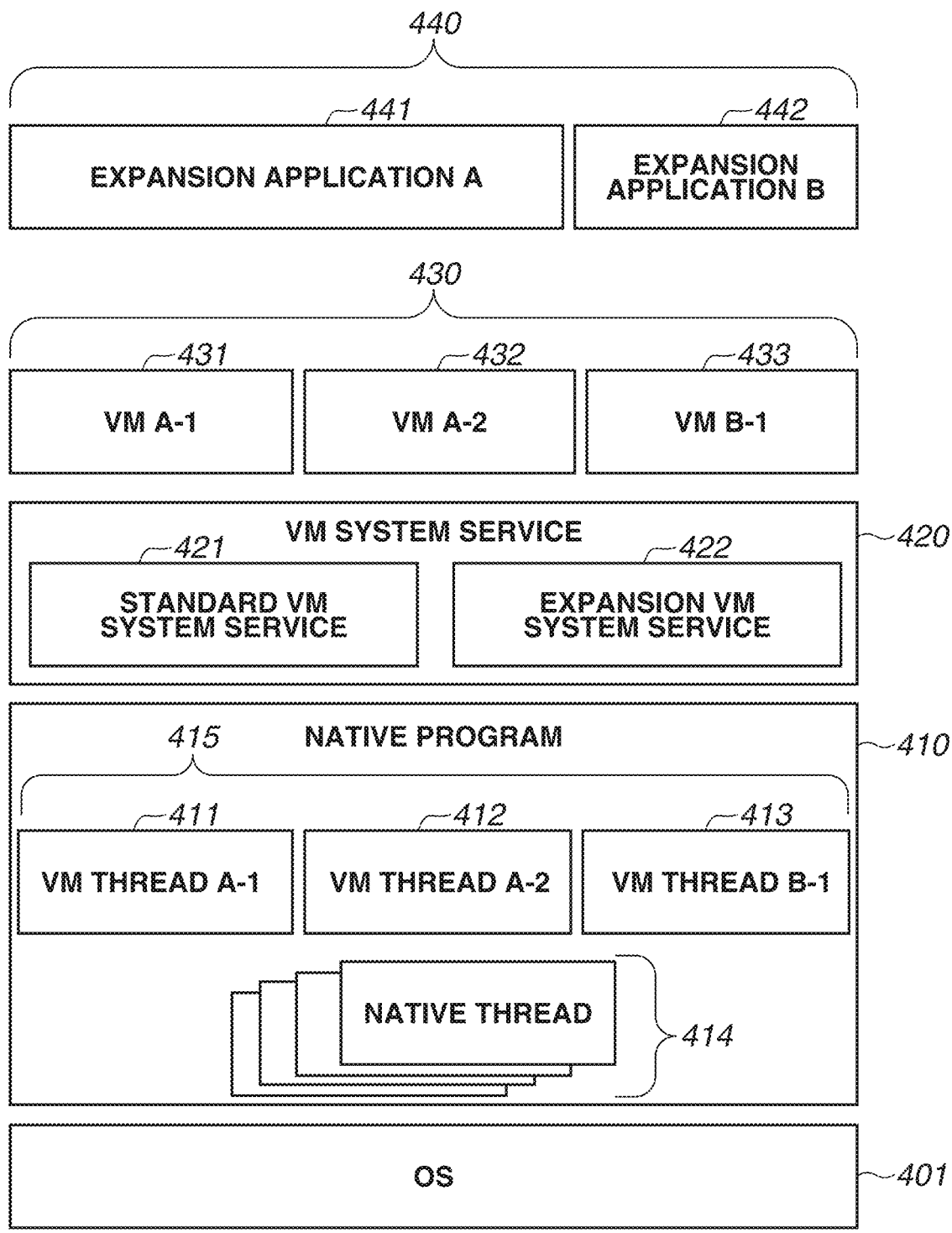

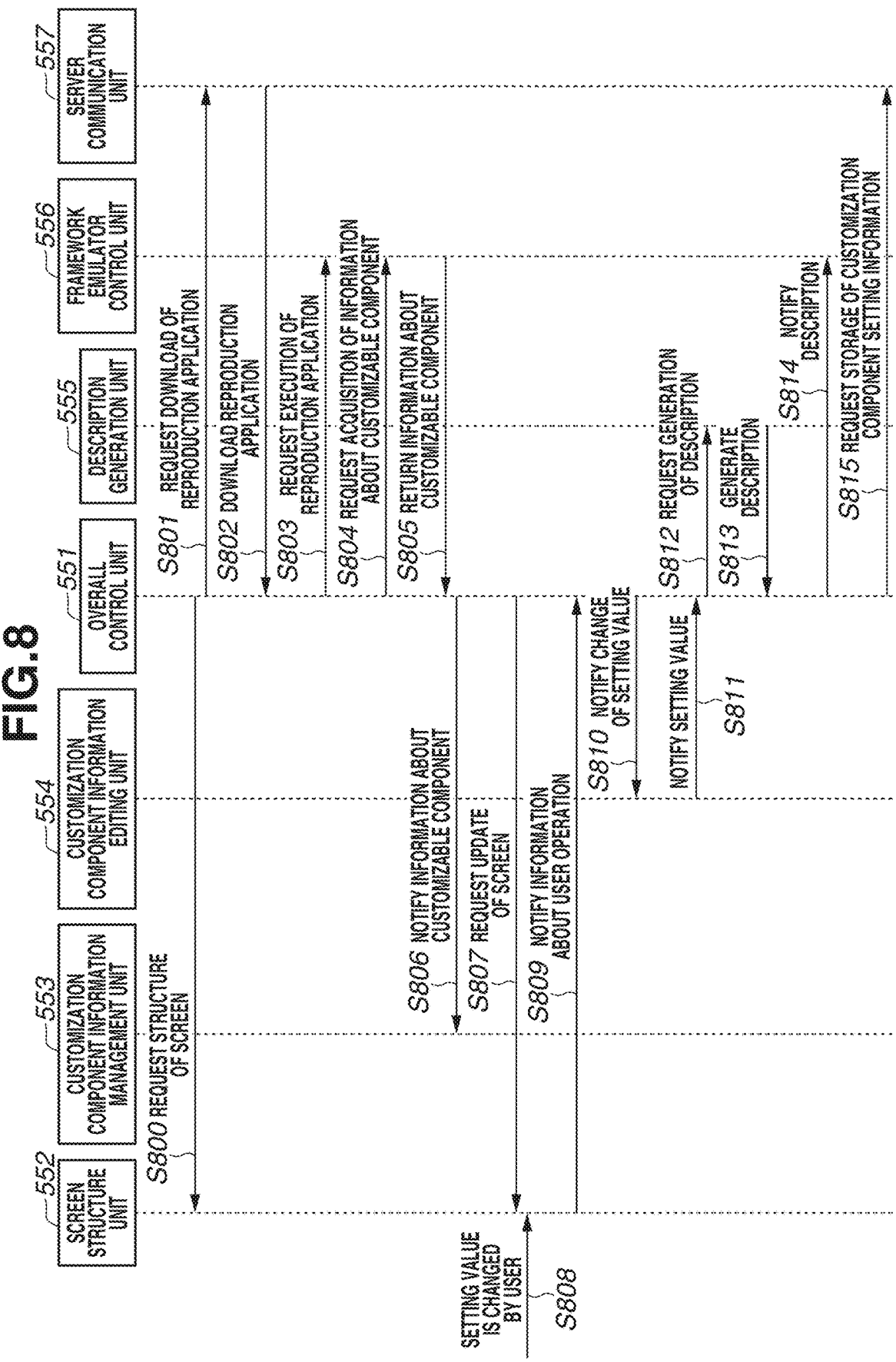

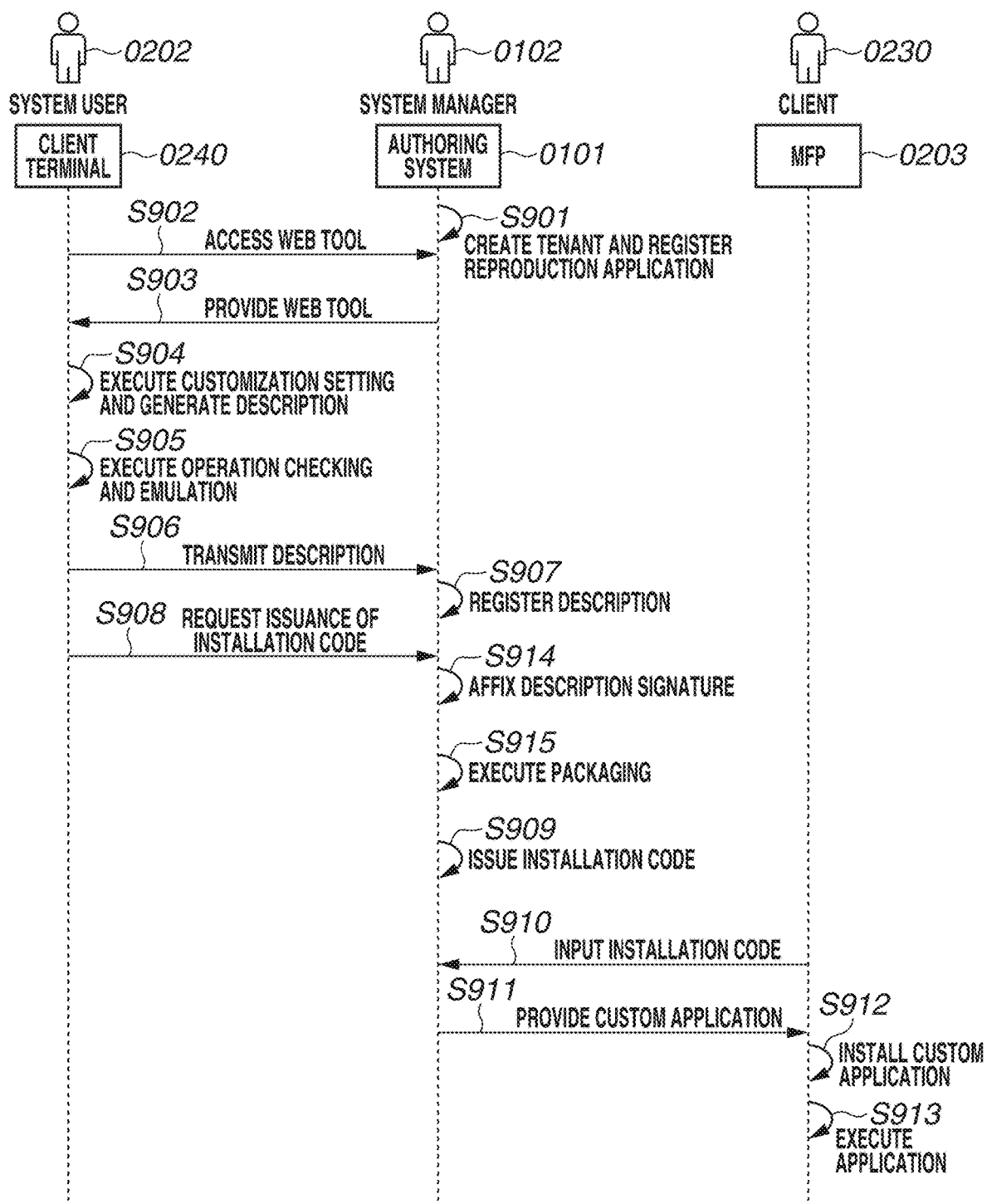

FIG.11

| FIG.11A |
|---|
| FIG.11B |

FIG.11A

```
{
  "panel": {
    "panel1": [  ~1101
      {  ~1103
        "id":"title",  ~1104
        "attrib": {  ~1105
          "title": {  ~1106
            "data_type": "string",  ~1107
            "data": {  ~1108
              "ja": "CUSTOM APPLICATION", "en": "Test Application"
            }
          }
        }
      },
      {  ~1109
        "id": "message",
        "attrib": {
          "message": {
            "data_type": "string",
            "data": {
              "ja": "EXECUTE COPY. \n "DISPLAY EASY-TO-TOUCH OK BUTTON", "en": "Run Copy."
            }
          }
        }
      },
      {  ~1110
        "id": "button",
        "attrib": {
          "position": {
            "data_type": "position",
            "data": {
              "x": 0, "y": 280, "width": 200, "height": 200
            }
          },
          "name": {
            "data_type": "string",
            "data": {
              "ja": "OK", "en": "OK",
            }
          },
          "action": {
            "data_type": "change_panel",
            "data": {
              "next_panel": "panel2"
            }
          }
        }
      },
```

FIG.11B

```
{   ~1111
    "id": "button",
    "attrib": {
      "position": {
        "data_type": "position",
        "data": {
          "x": 700, "y": 480, "width": 100, "height": 30
        }
      },
      "name": {
        "data_type": "string",
        "data": {
          "ja": "CANCEL", "en": "Cancel",
        }
      },
      "action": {
        "data_type": "change_panel",
        "data": {
          "next_panel": "exit"
        }
      }
    }
  }
],
"panel2": [  ~1102
  {
    "id" : "execute_job",  ~1112
    "attrib": {
      "job": {  ~1113
        "data_type": "job",
        "data": {
          "id": "copy",  ~1114
          "job_attrib": {  ~1115
            "copies": {  ~1116
              "data_type": "int_100",
              "data": 1
            },
            "color_mode": {  ~1117
              "data_type": "select",
              "data": "color"
            }
          }
        }
      },
      "action": {
        "data_type": "change_panel",
        "data": {
          "next_panel": "exit"
        }
      }
    }
  }
 ]
}
```

FIG.13
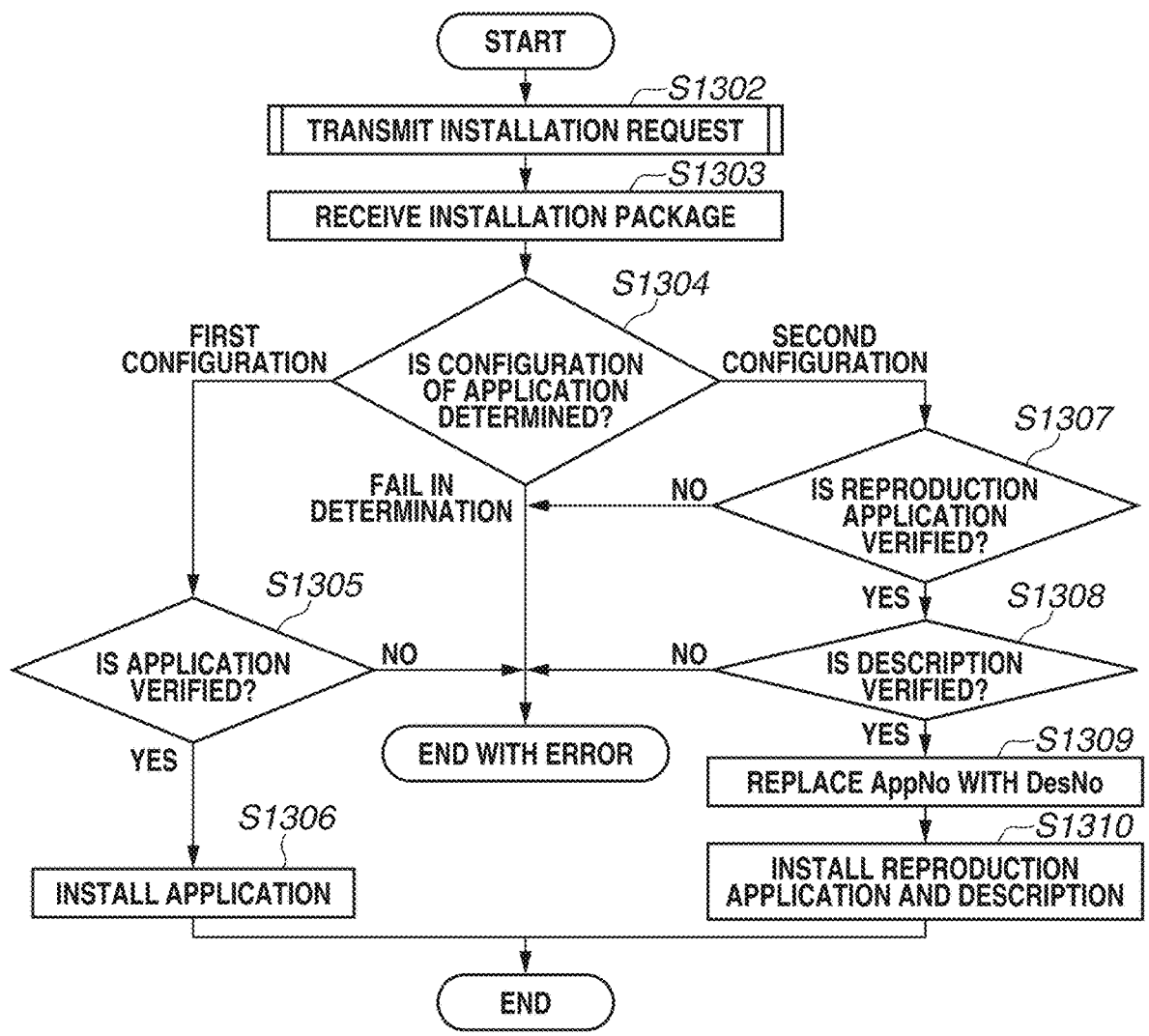
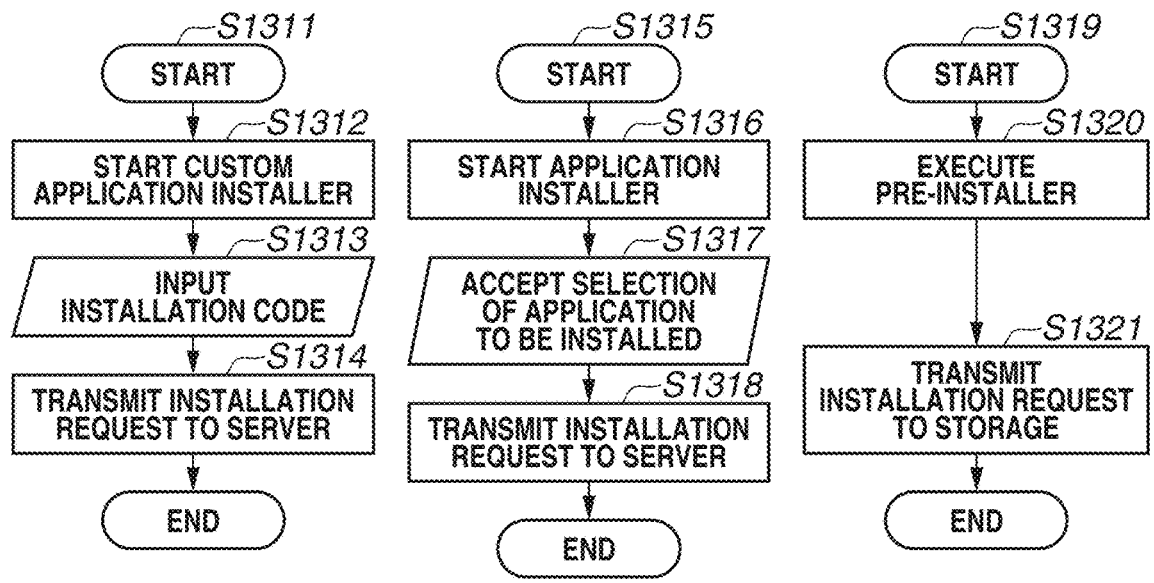

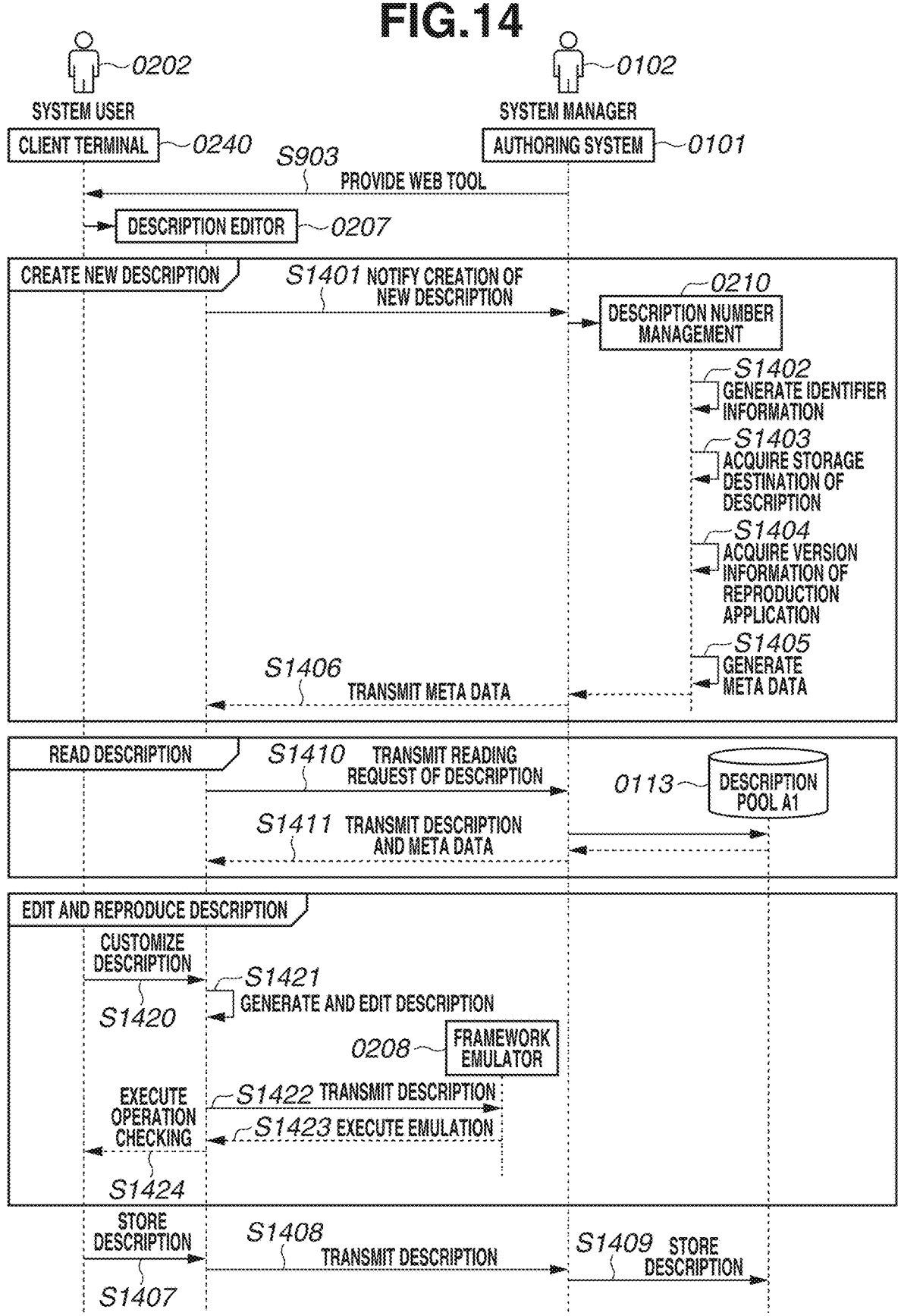

|  | APPLICATION META DATA | DESCRIPTION META DATA | DATA WITHIN MFP |
|---|---|---|---|
| APPLICATION 1 | AppNo: 0001 | — | APP/app0001/* |
| APPLICATION 2 | AppNo: 0002 | — | APP/app0002/* |
| CUSTOM APPLICATION A | AppNo: FFFF | DesNo: F00A | APP/appF00A/* |
| CUSTOM APPLICATION B | AppNo: FFFF | DesNo: F00B | APP/appF00B/* |

FIG.16

| | 1606 | 1607 | 1608 | 1609 | 1610 | 1611 | 1612 | 1613 |
|---|---|---|---|---|---|---|---|---|
| | DESCRIPTION NUMBER | DESCRIPTION NAME | VERSION | DATE OF UPDATE | VERSION OF REPRODUCTION APPLICATION | AUTHOR | PUBLICATION RANGE | INSTALLATION RECORD |
| | ... | ... | ... | ... | ... | ... | ... | ... |
| 1601 | F00A | SCAN APPLICATION | 1.10 | 2021/4/2 | 1.30 | ID0001 | tenant | 12 |
| 1602 | F00B | SUPER-COPY | 1.20 | 2021/5/27 | 1.50 | ID0012 | public | 21 |
| 1603 | F00C | TESTING APPLICATION | 1.00 | 2021/5/4 | 1.40 | ID0012 | private | 0 |
| 1604 | F00D | APPLICATION FOR COMPANY AA | 1.02 | 2021/5/1 | 1.40 | ID0005 | private | 5 |
| 1605 | F00C | APPLICATION FOR COMPANY BB | 1.00 | 2021/6/1 | 1.50 | ID0012 | private | 1 |

INFORMATION PROCESSING SYSTEM AND APPARATUS TO MANAGE COMBINED APPLICATION

BACKGROUND

Technical Field

One disclosed aspect of the embodiments relates to a system which edits an application installed in an information processing apparatus. In particular, the disclosure is related to an authoring system.

Description of the Related Art

A mechanism for installing an application in an information processing apparatus such as a multifunction peripheral (MFP) to expand functions thereof has been known. Japanese Patent Application Laid-Open No. 2016-2470 discusses a management technique using an identifier (ID) of an application installed in an information processing apparatus.

Clients who operate information processing apparatuses have various needs. Thus, a function which satisfies the needs of each client is preferably provided as an application. Further, in order to promptly respond to the demand of a client, it is preferable to allow a person in charge, such as a service engineer or a sales representative, to customize an application that is to be provided to the client.

SUMMARY

One aspect of the disclosed embodiments is directed to a system capable of appropriately managing a custom application based on a description file and application data.

According to an aspect of the disclosure, an information processing system that manages an application executed by an image processing apparatus with an application identifier includes one or more controllers configured to provide combined information of a reproduction application that reproduces a description file for defining operation procedures and a first description file as a first combined application, provide combined information of the reproduction application and a second description file as a second combined application, manage a first description identifier corresponding to the first description file and a second description identifier corresponding to the second description file, and manage the first combined application and the second combined application in a distinguishable manner based on the first description identifier and the second description identifier.

Further features of the disclosure will become apparent from the following description of exemplary embodiments with reference to the attached drawings.

BRIEF DESCRIPTION OF THE DRAWINGS

FIG. 2B is a block diagram illustrating a hardware configuration of a server apparatus used for the authoring system.

FIG. 4 is a diagram illustrating a hierarchical structure of software installed in the MFP.

FIG. 8 is a sequence diagram illustrating a sequence of processing executed by software modules of the description editor.

FIG. 9 is a sequence diagram illustrating processing for using the authoring system.

FIGS. 11, 11A and 11B are collectively a diagram illustrating a description.

FIG. 13 is a flowchart illustrating processing for installing an application.

FIG. 14 is a sequence diagram illustrating details of processing for generating a description.

FIG. 16 is a management table of descriptions.

DESCRIPTION OF THE EMBODIMENTS

Hereinafter, exemplary embodiments embodying disclosure will be specifically described with reference to the appended drawings. A scope of the disclosure is not limited to the configurations described in the exemplary embodiments. Further, various changes and modifications are possible within a scope where a similar effect can be acquired, so that a part of the configurations and processing may be omitted or replaced with configurations and processing equivalent thereto. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" refers to any combination of the software and hardware contexts as described above.

<Authoring System>

Figure 1:
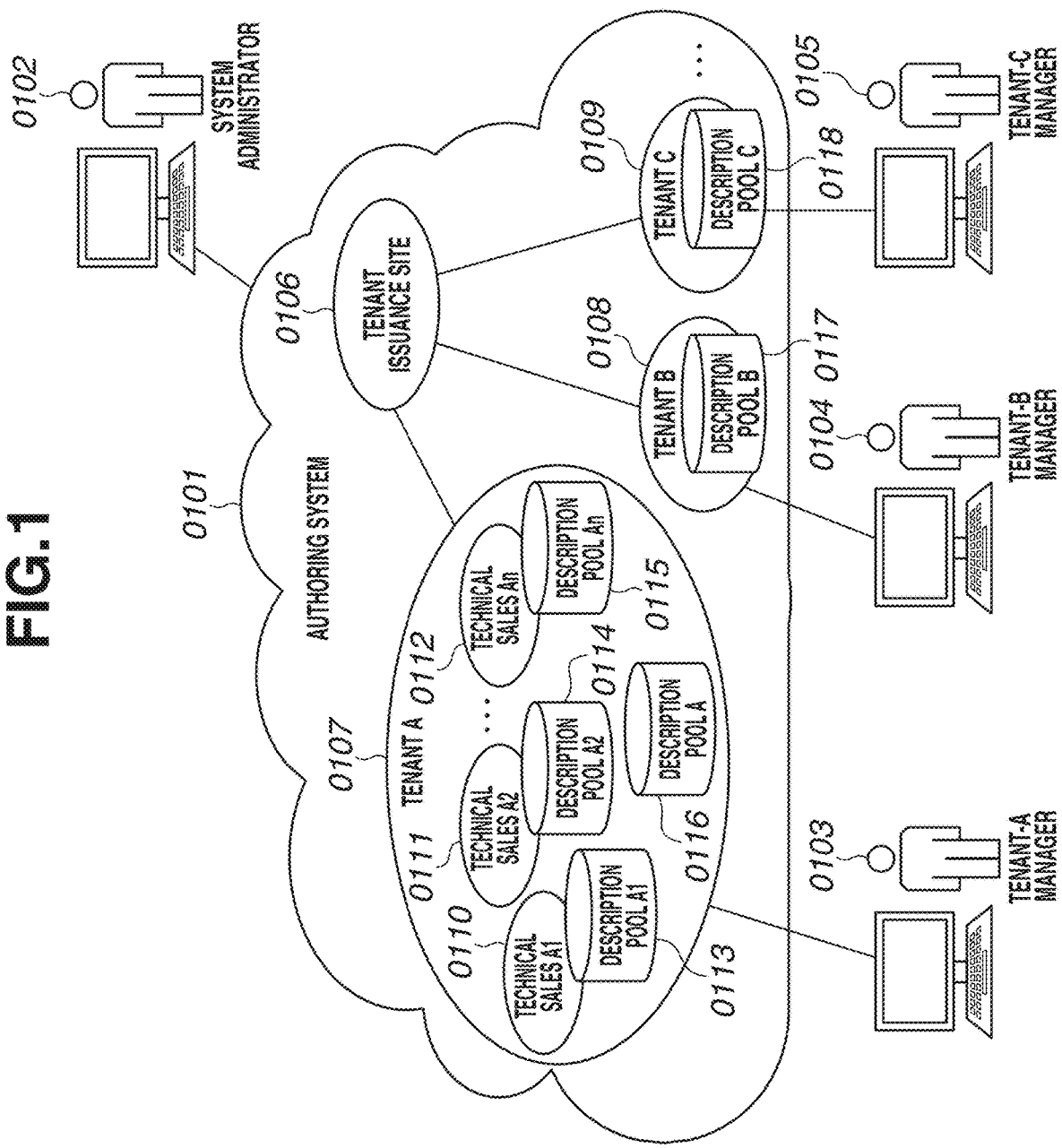
FIG. 1 is a diagram illustrating an authoring system.

A first exemplary embodiment will be described. FIG. 1 is a diagram illustrating an authoring system. An authoring system 0101 is an information processing system that provides an editing environment of a custom application executed by a multifunction peripheral (MFP) 0203. In the present exemplary embodiment, a person in charge, such as a service engineer or a sales representative, is allowed to customize an application by using the authoring system 0101. With this configuration, it is possible to promptly provide a custom application which satisfies the demand of a client. Further, it is possible to appropriately manage custom applications of which the types are increased in number in proportion to the number of demands of clients.

The authoring system 0101 is a system established on a general-purpose cloud service, and various apparatuses can access the authoring system 0101 via a network. All of managers and users who use the authoring system 0101 are managed by a user authentication system when they log in to the authoring system 0101. In other words, at the time of using the authoring system 0101, managers and users go through the procedures of user authentication using user IDs and passwords. In the present exemplary embodiment, a function provided by a general-purpose cloud service is used as a mechanism for executing the user authentication, and thus detailed descriptions thereof will be omitted. Alternatively, the authoring system 0101 may have a unique user authentication function.

The authoring system 0101 includes a tenant issuance site 0106, so that a user can create a plurality of tenants depending on purposes. FIG. 1 illustrates a state where at least a tenant A 0107, a tenant B 0108, and a tenant C 0109 are issued. For example, a system manager 0102 can create tenants for respective group sales companies in various country by accessing the tenant issuance site 0106 from a client terminal 0240 via a web browser. A tenant may be issued to a system integrator instead of a group sales company.

In a case where tenants are issued, one or more managers who manages the each tenant are allocated thereto. In the example illustrated in FIG. 1, at least a tenant-A manager 0103 who manages the tenant A 0107, a tenant-B manager 0104 who manages the tenant B 0108, and a tenant-C manager 0105 who manages the tenant C 0109 exist. A tenant manager of one tenant can set or delete another tenant manager.

A tenant manager can access a tenant managed thereby from a client terminal 0240 via a web browser to create a plurality of user accounts of users who use the tenant. In FIG. 1, the tenant-A manager 0103 creates accounts of a technical sales A1 0110, a technical sales A2 0111, . . . , and a technical sales An 0122. A description pool for storing descriptions is allocated to each of the accounts. Herein, "description" refers to a file (description file) which describes behavior (operation procedures) of a custom application, and the user can create a description by using the authoring system 0101. A configuration of the custom application and the description will be described below in detail.

In FIG. 1, a description pool is allocated to each of the accounts of the technical sales A1 0110, the technical sales A2 0111, . . . , and the technical sales An 0112. A description pool A1 0113, a description pool A2 0114, . . . , and a description pool An 0115 ("n" is a natural number) are allocated to the respective accounts. Similarly, the tenant-B manager 0104 and the tenant-C manager 0105 can also create accounts of respective users of the tenants B and C as appropriate, although these accounts are not illustrated in FIG. 1. Further, by arranging a shared description pool in a tenant, the tenant manager allows a plurality of accounts within the tenant to share one description. In the example illustrated in FIG. 1, a shared description pool A 0116 is arranged in the tenant A 0107, so that descriptions can be shared within the tenant A 0107. Similarly, as a configuration for sharing descriptions within a tenant, a shared description pool B 0117 and a shared description pool C 0118 are respectively arranged in the tenant B 0108 and the tenant C 0109.

In the present exemplary embodiment, the configuration will be described based on a condition that a shared description pool is arranged so that all of accounts within the tenant can read and write descriptions. Further, the settings on the shared description pool may be changed, so that the reading and writing operations of descriptions are limited depending on the accounts. Furthermore, the authoring system 0101 may provide a shared description pool accessible from the accounts of all of the tenants. The above-described limitation may also be placed on this shared description pool depending on the accounts.

<Processing for Using Authoring System>

Main processing for using the authoring system 0101 will be described with reference to FIG. 9. FIG. 9 is a sequence diagram illustrating the processing for using the authoring system 0101.

In step S901, the system manager 0102 executes processing for creating a tenant in the authoring system 0101 and processing for registering a reproduction application in the authoring system 0101. The information about a normal application is registered in the authoring system 0101 in addition to information about a reproduction application used for a custom application. These applications are managed based on uniquely-identifiable information, so that one application can be distinguished from another application. In step S902, the system user 0202 uses the client terminal 0240 to access a web tool based on the tenant information. The client terminal 0240 acquires the web tool from the authoring system 0101 via the network.

In steps S904 to S907, according to an instruction from the system user 0202, the client terminal 0240 executes processing for generating and registering a description by using the web tool. Step S904 executes the customization setting and generates the description. Step S905 executes the operation checking and emulation. Step S906 transmits the description. In step S907, upon receiving the description, the authoring system 0101 registers the description. The descriptions registered in the authoring system 0101 are managed in a distinguishable manner based on the uniquely-identifiable information. The processing for generating and registering a description will be described below in detail with reference to FIG. 14.

In step S908, with respect to a custom application that uses the registered description, the client terminal 0240 transmits an issuance request of an installation code to the authoring system 0101.

In step S914, upon receiving the issuance request of the installation code, the authoring system 0101 affixes signature information to a description 0219 through the use of a description signature affixation 0211 described below by using signature key information 0218. The signature key information 0218 is information different from the key information used for affixing a signature to a reproduction application described below. The key information used for affixing a signature to a reproduction application is managed in a development environment of the system developer 0201.

In step S915, the authoring system 0101 executes processing for packaging a signed description and a signed reproduction application through the use of a custom application packaging 0212 described below.

In step S909, the authoring system 0101 issues an installation code through the use of an installation code issuance system 0214, and registers the packaged custom application in a custom application distribution system 0213. The issued installation code is transmitted to a client 0230 from the system user 0202 via telephone, e-mail and other transmission methods.

In step S910, when the client 0230 inputs the installation code to the MFP 0203, the MFP 0203 transmits the installation code to the authoring system 0101.

In step S911, the authoring system 0101 provides a custom application corresponding to the received installation code to the MFP 0203 through the use of the custom application distribution system 0213.

In step S912, the MFP 0203 receives and installs the custom application. When installation is completed normally, then in step S913, the custom application is executed, so that the client 0230 can use a function provided by the custom application.

<Software Configuration of Authoring System>

Figure 2A:
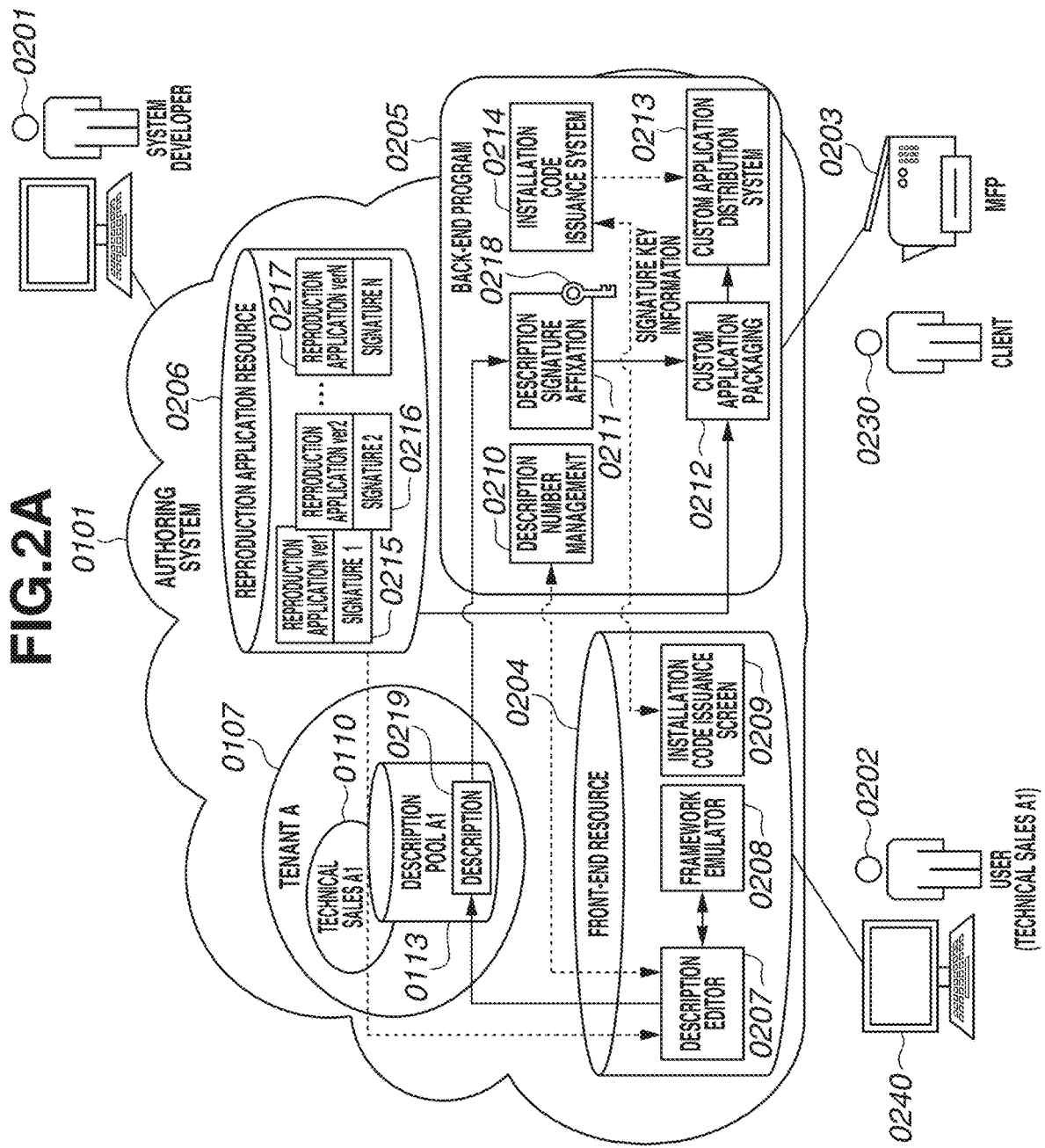
FIG. 2A is a diagram illustrating a software configuration of the authoring system.

Next, a software configuration of the authoring system 0101 will be described. FIG. 2A is a diagram illustrating a software configuration of the authoring system 0101.

In FIG. 2A, the authoring system 0101, the tenant A 0107, the technical sales A1 0110 as a user account, and the description pool A1 0113 are the same as those illustrated in FIG. 1.

The authoring system 0101 includes software modules such as a front-end resource 0204, a back-end program 0205, and a reproduction application resource 0206.

The front-end resource 0204 contains resources such as a description editor 0207, a framework emulator 0208, and an installation code issuance screen 0209. Each of the resources is a program described in a language such as JavaScript, and operates on a web browser used when the user 0202 accesses the authoring system 0101.

The description editor 0207 is a program (editing program) operating on the web browser when the user 0202 of the tenant creates or edits a description. A description created by the description editor 0207 can be stored in a description pool associated with a user account. In the example illustrated in FIG. 2A, the technical sales A1 0110 regarded as the user 0202 logs in to the authoring system 0101 to access the front-end resource 0204. Further, as illustrated in FIG. 2A, the description 0219 that is created by the technical sales A1 0110, i.e., the user 0202, through the use of the description editor 0207 contained in the front-end resource 0204 is stored in the description pool A1 0113. As described above, the description pool A1 0113 is associated with the user account of the technical sales A1 0110 created in the tenant A 0107.

The framework emulator 0208 is a program called when behavior of the description which is being created (edited) or has been created on the description editor 0207 is checked by the description editor 0207. The framework emulator 0208 is configured to operate on a web browser. The framework emulator 0208 emulates the operation of an application framework of a device to visualize the behavior of the custom application including the created description by outputting the behavior as screen information.

The installation code issuance screen 0209 is a program which displays an installation code on the web browser used by the user. The installation code is used when the custom application is installed in the device.

The back-end program 0205 contains programs such as a description number management 0210, the description signature affixation 0211, the custom application packaging 0212, the custom application distribution system 0213, and the installation code issuance system 0214.

Each of the programs contained in the back-end program 0205 is executed by a server apparatus 0220 on a cloud where the authoring system 0101 is arranged, and operates in cooperation with a program contained in the front-end resource 0204.

The description number management 0210 is a program which issues a unique serial number used for identifying each of the descriptions. The description number management 0210 is called when the user 0202 starts creating a new description through the use of the description editor 0207. The description number management 0210 is also called when the user 0202 discards a description created in the past. In a case where the description that the user 0202 desires to discard is not used as a custom application, the description number management 0210 restores the serial number which is allocated thereto when the description is created to a reusable state.

The description signature affixation 0211 is a program which affixes a signature to a description to guarantee that the description is not altered. For example, the signature is affixed when an installation package of the custom application including the created description is generated. The description signature affixation 0211 includes the signature key information 0218 used when the signature is affixed. In FIG. 2A, the description 0219 stored in the description pool A1 0113 is used as an example of a description to which a signature is affixed by the description signature affixation 0211.

The custom application packaging 0212 is a program for generating an installation package of a custom application. The installation package collectively includes a signed description generated by the description signature affixation 0211 and a specific reproduction application described below. By generating the installation package, the custom application can be installed in an optional device. A structure of the installation package will be described below in detail.

The custom application distribution system 0213 is a program of a system which distributes one or more installation packages of the custom applications previously associated with the installation codes issued by the installation code issuance screen 0209, to the device. Herein, one or more installation packages of the custom applications are called "installation package archive". When the custom application distribution system 0213 receives a distribution request including the installation code from the device together, the custom application distribution system 0213 transmits an installation package archive of the custom application associated with that installation code to the device. In the example illustrated in FIG. 2A, the MFP 0203 regarded as an example of the device is connected to the back-end program 0205 of the authoring system 0101, so that the installation packages of the custom applications are sequentially transmitted to the MFP 0203.

The installation code issuance system 0214 is a program which operates in cooperation with the installation code issuance screen 0209 to issue an installation code to one or more custom applications selected by the user. Further, the installation code issuance system 0214 internally retains a table which describes a relationship between the one or more selected custom applications (i.e., an installation package archive of custom applications) and issued installation codes. Details thereof will be described below.

Herein, the installation package archive of the custom applications may be generated on demand, or may be generated previously.

In a case where the installation package archive is configured to be generated on demand, the installation package archive is generated by the custom application packaging 0212 after the custom application distribution system 0213 receives a distribution request including the installation code from the device. On the other hand, in a case where the installation package archive is configured to be generated previously, the installation package archive is generated by the custom application packaging 0212 when the installation code issuance system 0214 issues the installation code. Then, the installation package archive is retained in the installation code issuance system 0214 together with the table describing a relationship with the issued installation code.

The reproduction application resource 0206 contains a signed reproduction application as a signed package, to which a signature has been affixed in advance, for reproducing a created description. The number of reproduction applications managed by the reproduction application resource 0206 is not limited to one. For example, a plurality of reproduction applications may separately be managed for each version. In the example illustrated in FIG. 2A, the reproduction application resource 0206 contains a reproduction application ver1 0215, a reproduction application ver2 0216, . . . , and a reproduction application verN 0217 together with the signatures affixed in advance. Corresponding signatures, "Signature 1", "Signature 2", . . . , and "Signature N", are affixed to the respective reproduction applications. Each of the reproduction applications is developed by a system developer 0201. Further, the signature is affixed in advance to the reproduction application in a development environment of the system developer 0201 where key information used for affixing the signature is managed strictly. Then, the reproduction application signed in advance is uploaded to the reproduction application resource 0206 by the system developer 0201 as appropriate. Each of the reproduction applications contained in the reproduction application resource 0206 includes customizable information. The user 0202 selects a version of the reproduction application when the user 0202 starts creating a description through the use of the description editor 0207. Then, the description editor 0207 acquires the customizable information unique to the reproduction application from the reproduction application of the selected version. In this way, the description editor 0207 does not need to statistically retain the information such as a menu item necessary to execute customization.

<Server Apparatus>

A hardware configuration for executing the software configuration of the authoring system 0101 illustrated in FIG. 2A will be described. The authoring system 0101 is a system established on the cloud, and a load thereof is allocated to and borne by a plurality of apparatuses. For the sake of simplicity, in the present exemplary embodiment, a configuration thereof is described based on a case where the processing is executed by a single server apparatus 0220. FIG. 2B is a block diagram illustrating a hardware configuration of the server apparatus 0220 used for the authoring system 0101.

The server apparatus 0220 includes a controller unit or circuit 250, and functions as an information processing apparatus for executing the authoring system 0101. The controller unit 250 includes a central processing unit (CPU) 252, a random access memory (RAM) 253, a hard disk drive (HDD) 255, a read only memory (ROM) 256, and a network interface (I/F) 257. The CPU 252, the RAM 253, the HDD 255, the ROM 256, and the network I/F 257 are connected to each other via a system bus 259.

The CPU 252 operates based on a program stored in the RAM 253 and controls the operations of the server apparatus 0220. In essence, the RAM 253 stored the program which includes instructions that, when executed by the CPU 252, cause the CPU 252 to perform operations described in the following. As mentioned above, these operations may correspond to functions, units, or modules. The ROM 256 is a boot ROM which stores a boot program of a system. The network I/F 257 is connected to a local area network (LAN) to receive and output various types of information via a network. Various programs including system software are stored in the HDD 255. A program stored in the HDD 255 is loaded on the RAM 253, and the CPU 252 controls the operations of the server apparatus 0220 based on the program.

The above-described information about the accounts of managers and users and the information about tenants, e.g., the tenant A 0107 in the example of FIG. 2A, are entirely stored in and managed by the HDD 255. The front-end resource 0204, the back-end program 0205, and the reproduction application resource 0206 illustrated in FIG. 2A are also stored in the HDD 255. In addition, a program for implementing the user authentication mechanism of the managers and the users described with reference to FIG. 1 is also stored in the HDD 255 although it is not illustrated. The program for implementing the user authentication mechanism is automatically loaded on the RAM 253 and executed by the CPU 252 when the server apparatus 0220 is activated. For example, when the system developer 0201 or the user 0202 (technical sales A1 0110) illustrated in FIG. 2A accesses the authoring system 0101 to log in to the system, a log-in request is transmitted to a user authentication program via the network I/F 257. Then, the user authentication program displays a log-in screen on a web browser of a personal computer (PC) operated by the system developer 0201 or the user 0202 (technical sales A1 0110). The description editor 0207 contained in the front-end resource 0204 is also stored in the HDD 255. For example, when the user 0202 (technical sales A1 0110) logs in to the authoring system 0101 to access a uniform resource locator (URL) of the description editor 0207, this request is transmitted to the server apparatus 0220 via the network I/F 257. Then, a program of the description editor 0207 is returned to the web browser of the PC operated by the user 0202 (technical sales A1 0110) and operates on the web browser. Processing similar to the above-described processing is executed with respect to the framework emulator 0208 and the installation code issuance screen 0209.

The description editor 0207 contained in the back-end program 0205 is also stored in the HDD 255. As described above, the back-end program 0205 is driven in cooperation with the program contained in the front-end resource 0204. Each of the modules including the description number management 0210 contained in the back-end program 0205 is loaded on the RAM 253 from the HDD 255 and executed by the CPU 252 when a driving request is transmitted.

<MFP>

Figure 3A:
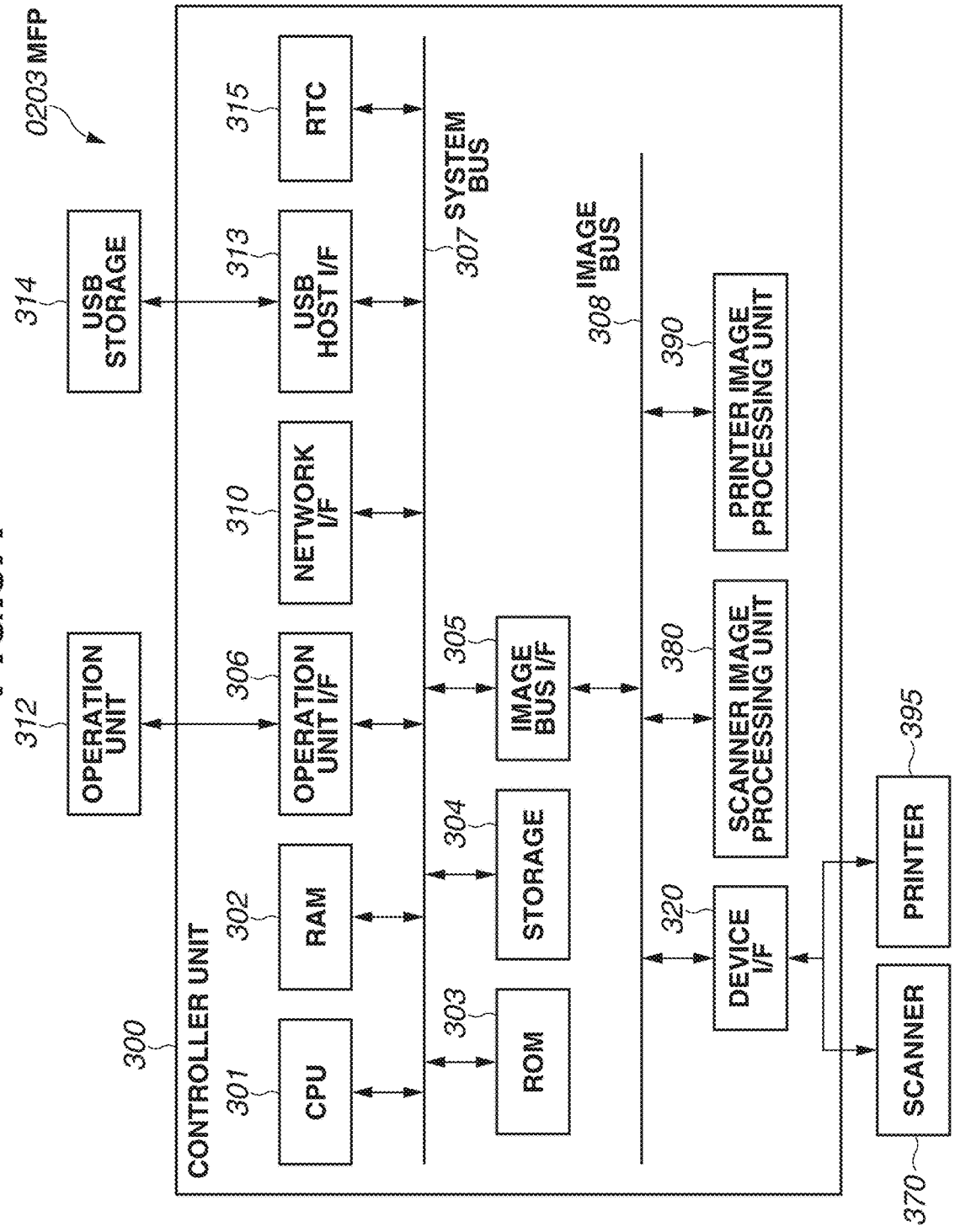
FIG. 3A is a block diagram illustrating a hardware configuration of a multifunction peripheral (MFP)
Figure 3B:
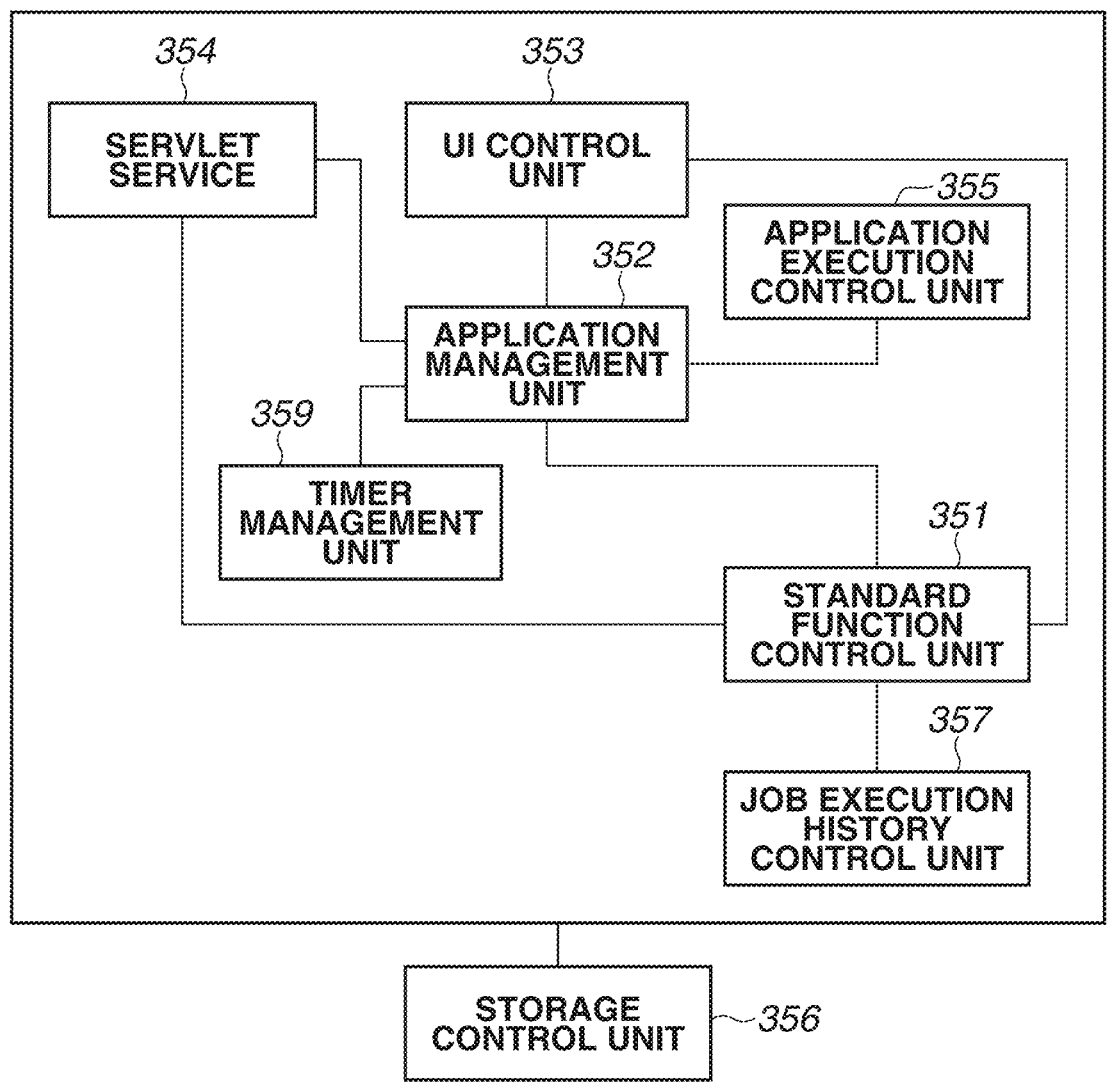
FIG. 3B is a block diagram illustrating a software configuration of the MFP.

The MFP 0203 serves as an information processing apparatus for processing information, an image processing apparatus for processing an image, and an image forming apparatus for forming an image on a sheet. FIG. 3A is a block diagram illustrating a hardware configuration of the MFP 0203. FIG. 3B is a block diagram illustrating a software configuration of the MFP 0203.

The MFP 0203 includes a controller unit 300, a printer 395, a scanner 370, an operation unit 312, and a universal serial bus (USB) storage 314. The controller unit 300 executes control processing for executing a copy function to cause the printer 395 to print and output image data read by the scanner 370. The scanner 370 is an image reading unit, circuit, or device which reads an image from a document. The printer 395 is an image forming unit, circuit, or device which forms an image on a sheet (paper). The operation unit 312 is a receiving unit configured to receive an instruction from a user, and also functions as a display unit configured to display information to the user.

The controller unit 300 includes a CPU 301, and the CPU 301 boots an operating system (OS) by executing a boot program stored in a ROM 303.

The CPU 301 executes various types of processing on the OS by executing a program stored in the storage 304. The execution of the CPU 301 is similar to the CPU 252 described above. A RAM 302 is used as a work area of the CPU 301. The RAM 302 provides an image memory area for temporarily storing image data in addition to providing a work area. The storage 304 stores a program and image data.

The ROM 303, the RAM 302, an operation unit I/F 306, a network I/F 310, a USB host I/F 313, an image bus I/F 305 are connected to the CPU 301 via a system bus 307. The operation unit I/F 306 is an interface with the operation unit 312 having a touch panel, and outputs image data to be displayed on the operation unit 312 to the operation unit 312. Further, the operation unit I/F 306 transmits the information input by the user via the operation unit 312 to the CPU 301. The network I/F 310 is an interface for connecting the MFP 0203 to the LAN. The USB host I/F 313 is an interface for communicating with the USB storage 314. The USB host I/F 313 functions as an output unit configured to store data stored in the storage 304 in the USB storage 314. Further, the USB host I/F 313 receives data stored in the USB storage 314 and transmits the data to the CPU 301. The USB storage 314 is an external storage device for storing data, attachable to and detachable from the USB host I/F 313. A plurality of USB devices including the USB storage 314 can be connected to the USB host I/F 313. A real-time clock (RTC) 315 controls the current time. Time information controlled by the RTC 315 is used when a job input time is recorded. The image bus I/F 305 is a bus bridge which connects the system bus 307 with an image bus 308 for transmitting image data at high speed to convert a data format. The image bus 308 is configured of a peripheral component interconnect (PCI) bus or a bus compliant with a standard of the Institute of Electrical and Electronics Engineers (IEEE) 3394. A device I/F 320, a scanner image processing unit 380, and a printer image processing unit 390 are connected to the image bus 308. The scanner 370 and the printer 395 are connected to the device I/F 320, and the device I/F 320 executes synchronous/non-synchronous conversion of image data. The scanner image processing unit 380 corrects, processes, and edits image data input thereto. The printer image processing unit 390 executes correction and resolution conversion appropriate to the printer 395 on the image data to be printed and output.

The CPU 301 loads a program stored in the storage 304 on the RAM 302, and executes the program to implement each individual module illustrated in FIG. 3B. FIG. 3B is a block diagram illustrating a software configuration of the MFP 0203.

As a software configuration of the MFP 0203, the MFP 0203 includes a servlet service 354, a user interface (UI) control unit 353, an application execution control unit 355, a storage control unit 356, an application management unit 352, a standard function control unit 351, and a timer management unit 359.

The servlet service 354 accepts a request when the user accesses the MFP 0203 via the network I/F 310 by using the hyper-text transfer protocol (HTTP). The servlet service 354 functions as a module which allocates processing to a module (either the application management unit 352 or the standard function control unit 351) depending on the URL accessed by the user.

The UI control unit 353 is a module which displays a screen on the operation unit 312 and accepts an operation issued by the user. Then, the UI control unit 353 notifies the information about the operation to an appropriate module (either the application management unit 352 or the standard function control unit 351). The application management unit 352 is a module which manages installation and activation of an expansion application 440 installed in the MFP 0203.

The application execution control unit 355 is a module which controls execution of an application activated by the application management unit 352. Specifically, the application execution control unit 355 controls a virtual machine (VM) thread 415, a VM system service 420, a VM 430, and the expansion application 440.

The storage control unit 356 is a module which records and manages a program of the expansion application 440 and setting information.

The application execution control unit 355 accesses the storage control unit 356 to read out a program of an application. Further, each of the modules accesses the storage control unit 356 to refer to a setting value and execute setting.

The standard function control unit 351 is a module which controls standard functions of the MFP 0203 such as a copy function and a fax function, and executes other controls necessary for the MFP 0203, e.g., control of the USB host I/F 313. Further, the standard function control unit 351 manages the executed copy function and the facsimile function as jobs, and requests the job execution history control unit 357 to record execution results of the jobs. In order to store the execution result of a job as a history in a storage, the job execution history control unit 357 requests the storage control unit 356 to record the history.

The timer management unit 359 acquires current time information from the RTC 315 to detect passage of a specified time, and notifies the application management unit 352 of the information. Upon receipt of the notification from the timer management unit 359, the application management unit 352 requests the application execution control unit 355 to execute timer processing of the application.

Herein, a relationship between the OS, the VM, and the application will be described in detail. FIG. 4 is a diagram illustrating a hierarchical structure of the software installed in the MFP 0203.

A native program 410 for controlling the image processing units such as the printer, the fax, and the scanner operates on an OS 401 as an operating system. Further, the VM 430 serving as an execution environment of the expansion application 440 operates on the OS 401 as an operating system. The VM 430 is a module which understands and executes a program for controlling the expansion application 440. The expansion application 440 always operates on the VM 430. Different from a program operating on the CPU 301, a program operating on the VM 430 operates according to an instruction dedicated to the VM 430. This instruction is called "bytecode". On the other hand, an instruction dedicated to the CPU 301 is called "native code". The VM 430 sequentially interprets and processes the bytecode, so that the native code and the bytecode dedicated to the VM 430 are executed on the CPU 301. There are a VM of one type which sequentially interprets and processes the bytecode as it is and a VM of another type which converts the bytecode into the native code to execute the converted code. Although the VM 430 according to the present exemplary embodiment is a VM of the former type, the VM 430 can also be of the latter type.

Generally, an instruction executed on one CPU is not compatible with an instruction executed on a certain CPU if types of the CPUs are different. Similarly, an instruction executed on a certain VM is not compatible with an instruction executed by another VM if types of the VMs are different. Although the present exemplary embodiment is described based on the condition that the expansion application 440 is described in a language called "Lua", the expansion application 440 may be described in another language. When Lua is used, a script described in Lua is converted into a bytecode dedicated to Lua, and this bytecode is executed on the VM 430 dedicated to Lua. Naturally, the bytecode dedicated to Lua cannot directly be executed by the CPU 301 because the bytecode is different from the instruction code directly executable by the CPU 301. The VM 430 dedicated to Lua is configured of the instruction code dedicated to the CPU 301, and function as a software module which sequentially interprets and executes the bytecode dedicated to Lua. Naturally, dedicated hardware which interprets and executes the bytecode dedicated to Lua can also be employed.

The native program 410 includes native threads 414 for controlling the image processing units such as the printer, the fax, and the scanner and VM threads 415 for operating the VM 430. The number of VM threads 415 corresponds to the number of VMs 430 exist. Herein, three threads, i.e., a VM thread A-1 411, a VM thread A-2 412, and a VM thread B-1 413, are generated.

A VM system service 420 is a utility library shared and used by the expansion applications 440. A development speed of the expansion application 440 can be accelerated by calling a function of the VM system service 420 from the expansion application 440. Further, the VM system service 420 can access each of the modules of the MFP 0203. The VM system service 420 includes a standard VM system service 421 for providing a minimum operation of the VM and an expansion VM system service 422 for providing an access to each of the modules of the MFP 0203 and a function of the OS. The standard VM system service 421 also includes a function of loading the expansion application 440. When the VM 430 executes an application programming interface (API) specified by a bytecode within the expansion application 440, the VM system service 420 associated with that API is called. A rendering API for executing optional rendering on a screen of the operation unit 312 and a job control API for requesting execution of an optional job of the MFP 0203 such as a copy job or a scan job are provided to the expansion VM system service 422.

The VM 430 executes the expansion application 440. The VM 430 is generated for each of the threads of the expansion application 440. In FIG. 4, a VM A-1 431 and a VM A-2 432 for executing two threads on an expansion application A 441 are generated. Further, in FIG. 4, a VM B-1 433 for executing one thread on an expansion application B 442 is generated.

An icon of each expansion application 440 is displayed on a main menu screen displayed on the operation unit 312 of the MFP 0203. The operation unit I/F 306 detects that the user has selected an icon via the operation unit 312 and transmits information on the detection to the CPU 301. The CPU 301 receives the information and starts the expansion application 440 selected by the user.

In the below-described exemplary embodiment, this mechanism (i.e., the VM system service 420 and the VM 430) for executing the expansion application 440 on the MFP 0203 is called "application framework".

<Client Terminal>

Figure 5A:
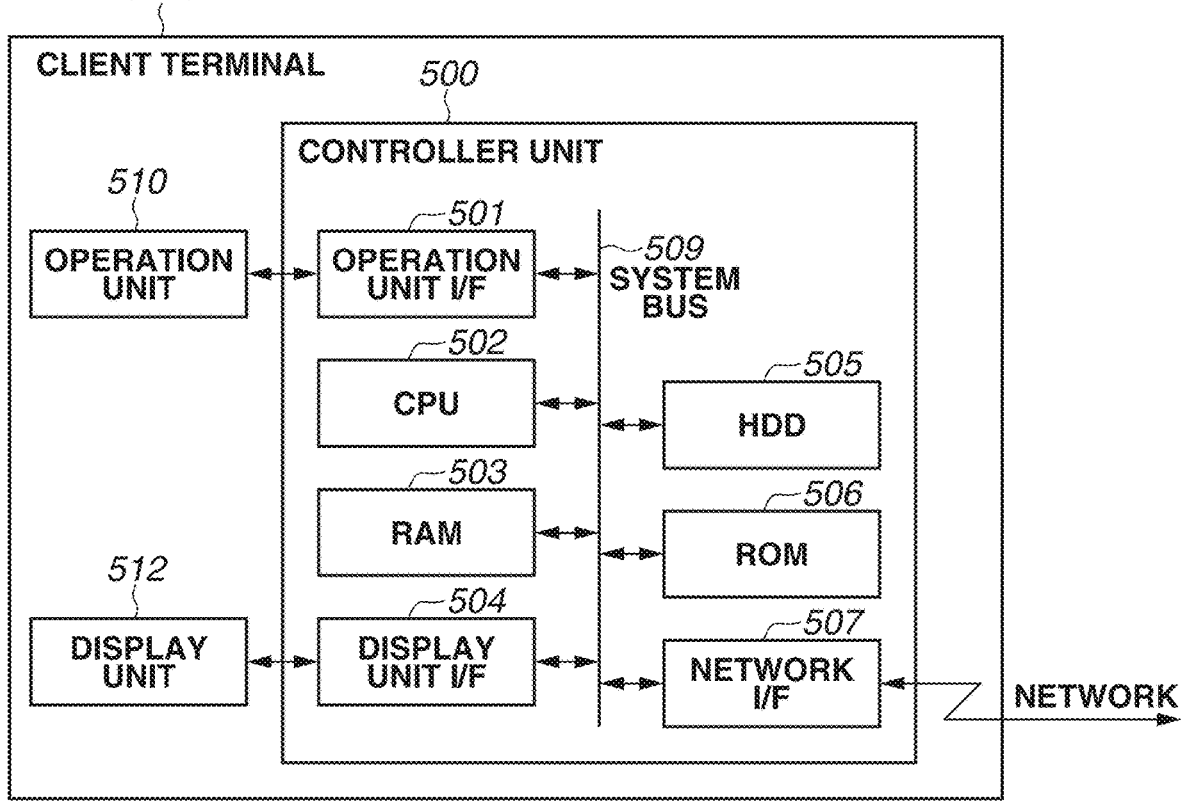
FIG. 5A is a block diagram illustrating a hardware configuration of a client terminal.

The client terminal 0240 used by the user 0202 will be described as a representative example of the commonly-used client terminals included in the system according to the present exemplary embodiment. In addition, a configuration described hereinafter can also be applied to the client terminals used by the system manager 0102, the tenant-A manager 0103, the tenant-B manager 0104, the tenant-C manager 0105, and the system developer 0201. FIG. 5A is a block diagram illustrating a hardware configuration of the client terminal 0240.

The client terminal 0240 is an external terminal which accesses the authoring system 0101. The client terminal 0240 includes a controller unit 500, an operation unit 510, and a display unit 512. The controller unit 500 is connected to and exchanges information with each piece of hardware via a system bus 509. The controller unit 500 loads a program such as an OS or a web browser stored in a ROM 506 or a HDD 505 on a RAM 503. The loaded program is sequentially processed by a CPU 502. The operation unit 510 is a receiving unit configured to receive an operation performed by the user 0202. The operation unit 510 is connected to an operation unit I/F 501, so that information about the user operation received by the operation unit 510 is notified to the CPU 502 via the operation unit I/F 501. The information about the operation is processed by a program executed by the CPU 502. Through the above-described processing, the operation performed by the user 0202 is processed, and an operation result is displayed on the display unit 512 connected to the display unit I/F 504, or output to the network connected to the network I/F 507.

In the present exemplary embodiment, a web browser is executed on the client terminal 0240, and the user 0202 accesses the authoring system 0101 illustrated in FIG. 1 via the web browser. This client terminal 0240 may be a general PC or a mobile terminal such as a smartphone.

Figure 6:
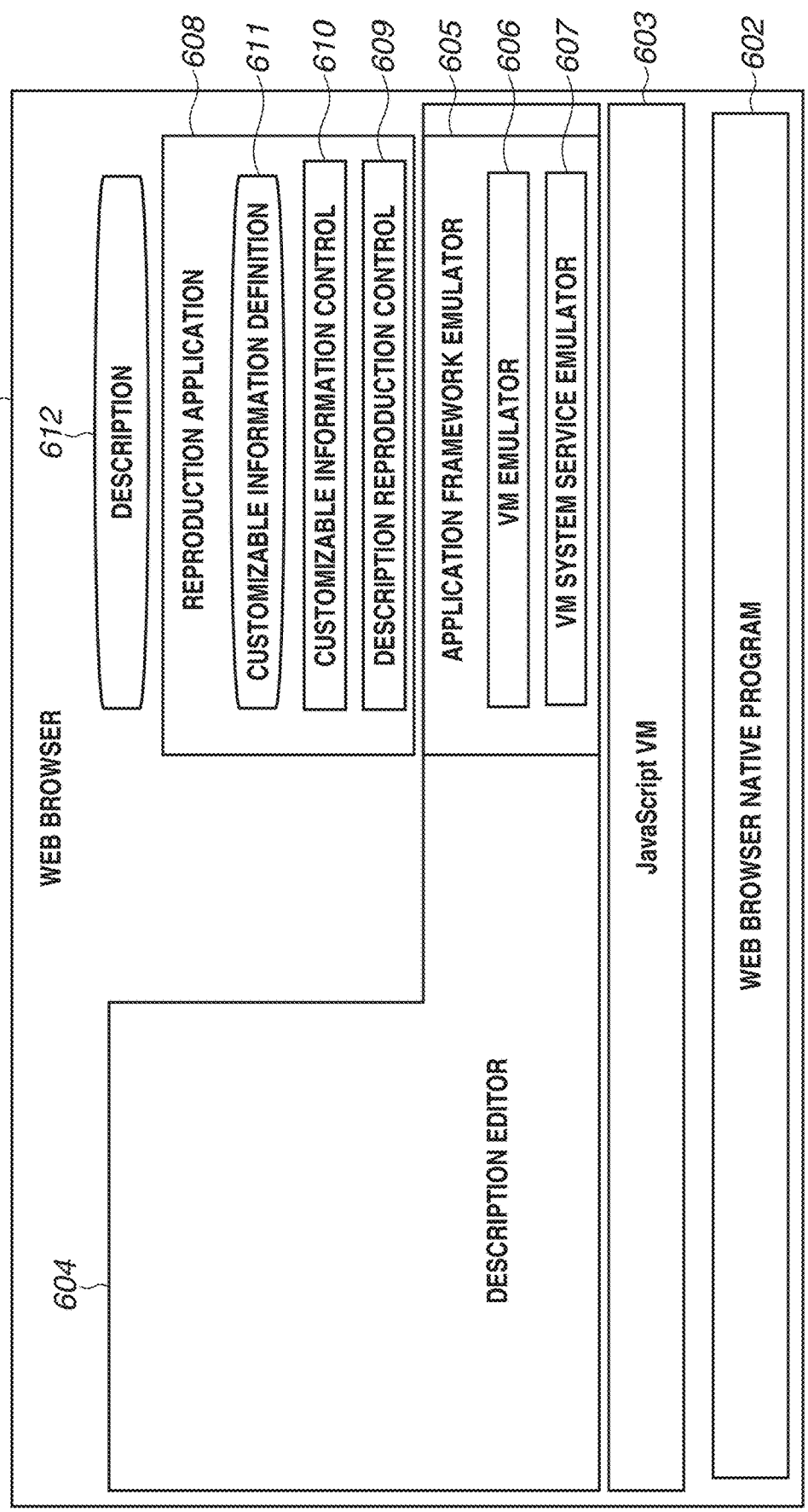
FIG. 6 is a diagram illustrating a hierarchical structure of software relating to the description editor.

Next, a case in which a description editor is executed by the client terminal 0240 on the web browser will be described. FIG. 6 is a block diagram of a web browser which displays a description editor.

A web browser 601 is software for connecting the client terminal 0240 to a web server, and can display a web page and execute a program. The web browser 601 can execute a JavaScript VM 603 on a web browser native program 602 serving as a native program for operating the web browser 601 itself. The JavaScript VM 603 is a program for executing JavaScript on the web browser 601.

A description editor 604 is a program described in JavaScript. The description editor 604 is an example of the description editor 0207 illustrated in FIG. 2A. The description editor 604 is executed on the JavaScript VM 603. The description editor 604 is a program which provides an editing environment of the application.

The description editor 604 also functions as an application framework emulator 605. The application framework emulator 605 emulates an application framework for executing a program described in a language different from JavaScript on the web browser 601. The application framework emulator 605 is an example of the framework emulator 0208 illustrated in FIG. 2A. In the present exemplary embodiment, the application framework emulator 605 emulates the execution environment of a language the same as the language of the application executed on the MFP 0203. In addition, the application framework emulator 605 includes a VM system service emulator 607 and a VM emulator 606. These emulators 606 and 607 are programs described in JavaScript, and the VM emulator 606 and the VM system service emulator 607 respectively emulate the operations of the VM 430 and the VM system service 420 in FIG. 4 in JavaScript.

A reproduction application 608 is an application (reproduction application) which operates based on a description customized by the user 0202. The reproduction application 608 is configured in a same way as the application executed on the application framework of the MFP 0203. In FIG. 6, the reproduction application 608 is executed on the application framework emulator 605. The reproduction application 608 includes a customizable information control 610 which executes processing with respect to an inquiry about customizable information from the VM system service 420. The reproduction application 608 further includes a customizable information definition 611 and a description reproduction control 609 for reproducing a given description.

A description 612 is data which retains the customization information edited by the user 0202 in a format reproducible by the reproduction application 608. When the user 0202 inputs content of editing instructions to an edit screen provided by the description editor 604, a description 612 is generated by the description editor 604. The description editor 604 reproduces the generated description 612 through the use of the reproduction application 608 operating on the application framework emulator 605. Through the above-described processing, a screen for checking the operation of the customized application is provided to the user 0202 via the web browser 601.

In the present exemplary embodiment, JavaScript is used as a programming language for describing the description editor 604. However, the description editor 604 may be configured of another code such as WebAssembly directly executable on the web browser 601.

Further, the reproduction application executed by the description editor 604 needs not be the same as the reproduction application executed by the MFP 0203. For example, only a description reproduction control portion of the reproduction application, which directly relates to customization, may be extracted and loaded as the application for checking the operation.

Figure 5B:
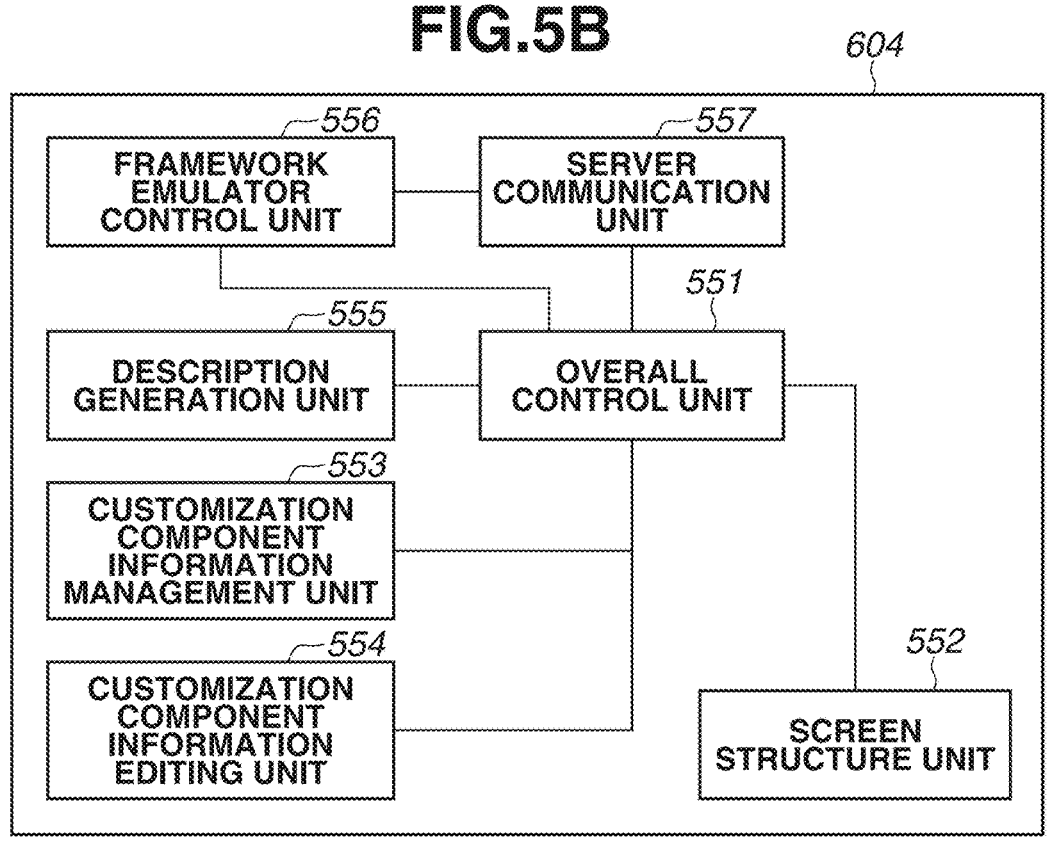
FIG. 5B is a block diagram illustrating a software configuration of a description editor executed by the client terminal.

Next, the description editor 604 is described in detail. FIG. 5B is a block diagram illustrating a software configuration of the description editor 604 executed by the client terminal 0240.

The description editor 604 is a program described in JavaScript, which is downloaded by the web browser 601 by accessing a predetermined URL and executed by the web browser 601. The description editor 604 is configured of an overall control unit 551, a screen structure unit 552, a framework emulator control unit 556, a server communication unit 557, a description generation unit 555, a customization component information management unit 553, and a customization component information editing unit 554.

Figure 7A:
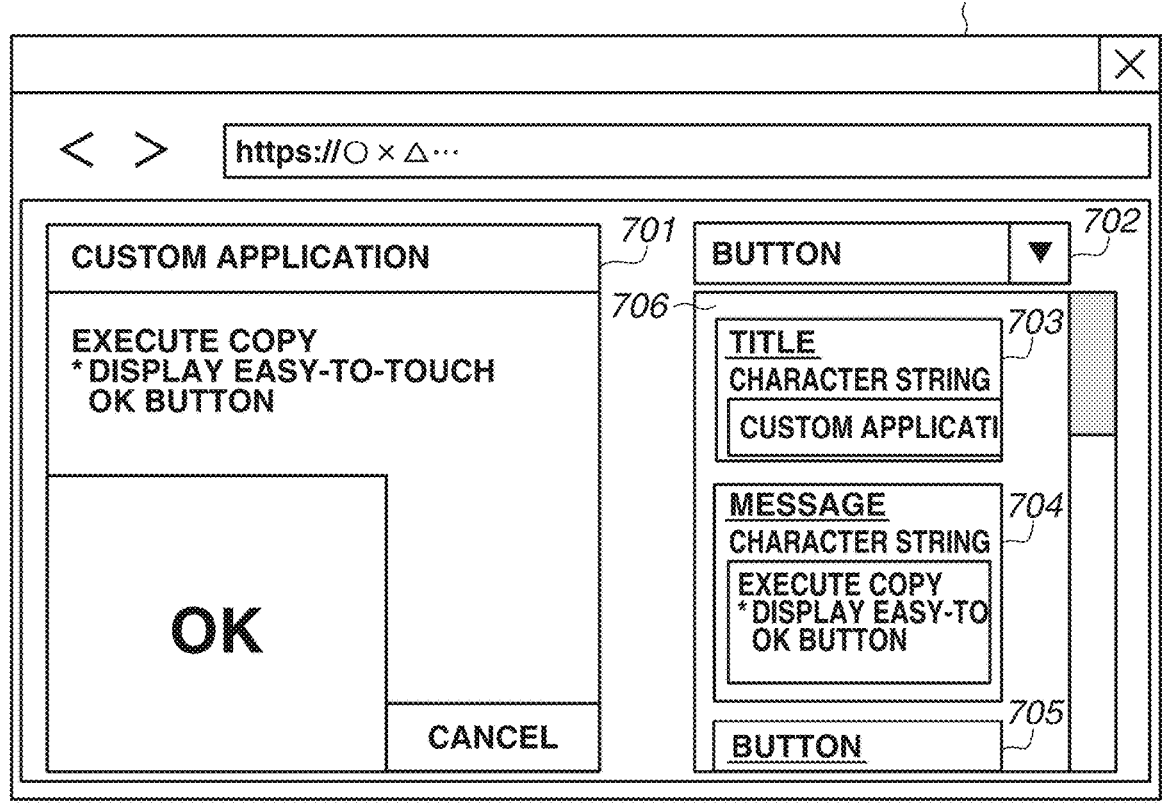
FIG. 7A is a diagram illustrating a screen of the description editor.

The overall control unit 551 controls the entire description editor 604. The overall control unit 551 operates in cooperation with each of the blocks to control the description editor 604. The screen structure unit 552 controls a screen structure of the description editor 604. The screen structure unit 552 updates a hyper-text markup language (HTML) element and cascading style sheets (CSS) (screen information), which constitute the screen illustrated in FIG. 7A. Further, the screen structure unit 552 receives an operation performed by the user 0202 and notifies the overall control unit 551 of the content of the operation (editing operation). Upon receipt of the notification of the content of the operation, the overall control unit 551 executes control appropriately. In a case where the notification of the operation is the information about the operation performed on a display area 701 of the application screen image, the overall control unit 551 notifies the framework emulator control unit 556 of the information about the operation. For example, when the user 0202 clicks the display area 701 of the application screen image, information about a click operation performed on a predetermined place in the application execution screen is notified the framework emulator control unit 556. The framework emulator control unit 556 executes a reproduction application which reproduces a customized description on the web browser 601. Because the reproduction application is configured to operate on the application framework of the MFP 0203, the reproduction application cannot directly be executed on the web browser 601. The framework emulator control unit 556 executes emulation to enable the application for the MFP 0203 to be executed on the web browser 601. The framework emulator control unit 556 receives the notification of a screen operation from the overall control unit 551, and notifies the application executed within the emulator of the information about the operation. The application notified of the information about the operation updates a screen according to the operation. The screen is updated through the use of a screen rendering API within the application framework. This API is replaced with a screen image rendering API within the web browser 601 by the framework emulator, so that a display screen of the application is displayed on the display area 701 of the application screen image in FIG. 7A. The customization component information editing unit 554 acquires information about customizable components from the reproduction application, converts the component information into a format usable by the description editor 604 based on the information, and retains the converted component information. Based on the information about components, the screen structure unit 552 configures a component list 702 and a display area 706 of the customization setting information. The customization component information management unit 553 manages the setting information about customization components currently set. Based on this information, the screen structure unit 552 configures the display area 706 for the customization setting information. The description generation unit 555 generates a description based on the current setting information retained by the customization component information editing unit 554. This description is notified the reproduction application via the framework emulator control unit 556. Through the above-described configuration, the reproduction application reproduces the description, so that the display area 701 of the application screen image in FIG. 7A is updated.

The server communication unit 557 controls communication with the server apparatus. Through the communication with the server apparatus, the component setting information retained by the customization component information editing unit 554 is saved in the server apparatus, and a reproduction application executed by the framework emulator control unit 556 is downloaded. With this configuration, even if the number of pieces of customizable information of the reproduction application is increased or decreased or operations thereof are changed, editing functions appropriate for the reproduction application can be provided without changing the editing environment provided by the description editor 604.

<Management of Description>

Generation and registration of the description in steps S904 to S907 in FIG. 9 will be described in detail. FIG. 14 is a sequence diagram illustrating details of generation of the description in steps S904 to S907.

In the processing illustrated in FIG. 14, when the client terminal 0240 accesses the authoring system 0101 via the web browser 601, in step S903, the authoring system 0101 provides the description editor 0207 and the framework emulator 0208 contained in the front-end resource 0204 to the client terminal 0240. In a case where a description is to be newly created, in step S1401, the description editor 0207 transmits a notification of creation of a new description to the description number management 0210 contained in the back-end program 0205 of the authoring system 0101. In step S1402, the description number management 0210 that receives the notification generates identifier information which does not overlap with identification information about any existing application and identification information about any existing description. Next, in step S1403, the back-end program 0205 identifies the tenant of the system user 0202 based on the access information and determines a storage destination of the description. Then, in step S1404, the back-end program 0205 acquires version information about the reproduction application corresponding to the description to be created. In step S1405, the back-end program 0205 generates meta data from the identifier information and the version information about the reproduction application. Then, in step S1406, the back-end program 0205 transmits the meta data to the description editor 0207 of the client terminal 0240. When the existing description is to be edited, in step S1410, the description editor 0207 transmits a reading request of the description to the description pool A1 0113. Then, in step S1411, the authoring system 0101 transmits the specified description and meta data to the description editor 0207. When a new description is to be created based on the existing description, meta data is created in a same way as the processing in steps S1401 to S1406 executed when a description is newly created.

After a description is newly created or a description is read, in steps S1420 to S1424, customization of the description and operation checking are executed by the description editor 0207 and the framework emulator 0208. Customization of the description will be described below in detail.

After the description is customized, in step S1407, the system user 0202 performs an operation for storing the customized description. In step S1408, the description editor 0207 accepts the storage operation and transmits the description to the authoring system 0101. The authoring system 0101 stores the description in a corresponding storing destination.

As described above, the description is managed by the authoring system 0101. FIG. 16 is a diagram illustrating an example of a management table of the description number management 0210.

As illustrated in the management table in FIG. 16, the authoring system 0101 stores the information related to the description and appropriately manages the description.

The pieces information described in respective columns, a description number column 1606, a description name column 1607, a version column 1608, a date of update column 1609, a version of reproduction application column 1610, an author column 1611, a publication range column 1612, and an installation record column 1613 are managed with the management table.

The pieces of information described in the description number column 1606, the author column 1611, and the version of reproduction application column 1610 are registered when a new description number is issued. The information issued by the description number management 0210 is stored in the description number column 1606. The information about the user who has requested issuance of the description number and operated the description editor 0207 is registered in the author column 1611. The information about a version of the current reproduction application corresponding to the description is registered in the version of reproduction application column 1610.

The pieces of information described in the description name column 1607, the date of update column 1609, and the version of reproduction application column 1610 are updated when the description is edited and stored. A name specified by the user 0202 is registered in the description name column 1607. A numerical value that expresses a date of update of the description is registered in the date of update column 1609.

The information about a range of allowed users who can access a stored description and edit or duplicate the description is registered in the publication range column 1612. For example, ranges such as "all of users", "users belonging to the same tenant", and "only one individual", can be specified as the publication range. The information registered in the publication range column 1612 can be changed at an optional timing, e.g., a timing when the description is stored.

A numerical value that expresses the number of times the application using a registered description is issued and installed in the apparatus used by the client is registered in the installation record column 1613. The information registered in the installation record column 1613 can be used as a material for understanding the market needs and can be also used for stocktaking processing of description numbers. For example, the authoring system 0101 checks the installation record column 1613 of the management table when a description stored in the description pool A1 0113 is to be deleted. Then, the description number is released if a numerical value registered in the installation record column 1613 is "0". If that numerical value is not "0", the description number is maintained without being released. The released description number can be allocated to e new description when the new description is generated. In other words, the description number can be used again.

For example, because description information 1603 has no record of installation, a description number "F00C" is released when the description is deleted. Then, the description number "F00C" is used again when another description information 1605 is created. On the other hand, a description number will not be used again if description information (i.e., description information 1601, 1602, or 1604) having a record of installation is deleted.

<Processing of Editing Description>

First, an execution screen of the description editor 604 for creating a custom application will be described. FIG. 7A is a diagram illustrating a screen of the description editor 604. When the user 0202 accesses the authoring system 0101 via the web browser 601 and starts customization of the application, a screen 700 is displayed on the web browser 601. The screen 700 is configured of HTML, JavaScript, and css downloaded from the server apparatus, so that the web browser 601 interprets the respective pieces of information and executes rendering. As a result, the screen 700 is displayed thereon. In the present exemplary embodiment, creation of a custom application for displaying an easy-to-select copy execution button will be described as an example of the processing executed in response to a demand of a client. A plurality of items (objects) is arranged on the screen 700, and an editing environment of the application is provided to the user 0202. Main constituent elements of the screen 700 will be described below.

The display area 701 displays an image in a case where the application (application being edited) which reflects the content customized by the user 0202 is executed. In the present exemplary embodiment, although the display area 701 is configured of an HTML canvas element, the display area 701 may be configured of another HTML element which can be rendered. Through the above-described configuration, the user 0202 can customize the application while looking at the display area 701 to check whether desired customization is executed.

The component list 702 is a pull-down display object which displays a list of customizable (addable) display components. The user 0202 can customize the application by selecting a desired component from the component list 702 and adding the component to the application. Examples of the editable components include a button that can be associated with a function, title information, and message information.

A result obtained by adding the component is promptly reflected on the display area 701, so that the user 0202 can easily check the customization state.

The display area 706 is an area for displaying customization setting information, and a component being currently set and information set to the component are displayed on the display area 706. FIG. 7A illustrates a state where a title component 703, a message component 704, and a button component 705 are being set. The user 0202 can customize the component by editing the information about the component displayed on the display area 706. For example, it is assumed that a character string "Custom Application" displayed on the title component 703 is edited and changed to "Test Application". In this case, the edited content is reflected on the display area 701, so that the character string "Custom Application" is updated with a character string "Test Application". Further, a size or a layout of the component can also be changed by editing the parameter of the component.

Next, processing for executing the description editor 604 will be described. FIG. 8 is a diagram illustrating a sequence of processing executed by the software modules of the description editor 604. The respective pieces of processing are implemented by the controller unit 500. More specifically, the CPU 502 acquires a program of the web browser 601 from the ROM 506, loads the program on the RAM 503 and executes the description editor 604 via the JavaScript VM 603, so that the respective pieces of processing can be implemented.

In the processing executed by the description editor 604, first in step S800, the overall control unit 551 requests the screen structure unit 552 to configure a screen. The screen structure unit 552 configures an editing screen as illustrated in FIG. 7A. At this time, the component list 702 and the display area 706 for the customization setting information are configured with empty spaces because the information about customizable components has not been fixed. Next, in step S801, the overall control unit 551 requests the server communication unit 557 to download a reproduction application. The server communication unit 557 receives the request and downloads the reproduction application from the server apparatus. In step S802, the server communication unit 557 notifies the downloaded reproduction application to the overall control unit 551. In step S803, the overall control unit 551 requests the framework emulator control unit 556 to execute the reproduction application. The framework emulator control unit 556 executes the requested reproduction application. In step S804, the overall control unit 551 requests the framework emulator control unit 556 to acquire the information about customizable components. In step S805, the framework emulator control unit 556 receives the request, and requests the reproduction application to provide the information about customizable components. Then, the framework emulator control unit 556 returns the acquired information about customizable components to the overall control unit 551. In step S806, the overall control unit 551 notifies the customization component information management unit 553 of the acquired information about customizable components. Based on the notified information, the customization component information management unit 553 converts the component information into data in a format processible by the description editor 604. Next, in step S807, the overall control unit 551 requests the screen structure unit 552 to update the screen. At this time, because the information about customizable components is fixed, the information is reflected on the component list 702 and the display area 706 for the customization setting information, so that the user can starts customizing the application. In step S808, the user adds a component from the component list 702. In step S809, the screen structure unit 552 receives the notification of change, and notifies the overall control unit 551 of information about the user operation. In step S810, the overall control unit 551 notifies the customization component information editing unit 554 of a change of the setting value. In step S811, the customization component information editing unit 554 checks the set value, and notifies the current setting value to the overall control unit 551. In step S812, the overall control unit 551 requests the description generation unit 555 to generate a description based on the current setting value. In step S813, the description generation unit 555 generates a description based on the current setting value and notifies the overall control unit 551 of the description. In step S814, the overall control unit 551 notifies the framework emulator control unit 556 of the description. The framework emulator control unit 556 reproduces the description through the use of the reproduction application, so that the display area 701 of the application screen image is updated Lastly, the overall control unit 551 requests the server communication unit 557 to store the edited customization component setting information. Upon receipt of the request, the server communication unit 557 requests the server apparatus to store the customization component setting information. Through the above-described processing, customization information about the application set by the user 0202 is stored in the server apparatus. This information is loaded when the user 0202 executes customization of the application next time, so that the user 0202 can customize the application in a state where the information edited by the user 0202 is reflected thereon.

Next, a structure of a description will be described. FIGS. 11A and 11B are collectively a diagram illustrating a description. FIGS. 11A and 11B collectively illustrate an example of a description corresponding to the application setting information customized in FIG. 7A. In other words, FIGS. 11A and 11B collectively illustrate a description corresponding to the application which displays a copy execution confirmation screen and executes a copy job when an "OK" button is pressed. In the present exemplary embodiment, the content of the description is described in a JavaScript Object Notation (JSON) format having high compatibility with a web browser. Another format can also be used as a format of the description.

The description generally consists of panel information 1101 and 1102. Component information and customization information of each component are stored in the panel information 1101. Component information such as title component information 1103, message component information 1109, OK button component information 1110, and cancel button component information 1111 are included in the panel information 1101. Customization information of each component such as component ID information 1104, component setting information 1105, component parameter information 1106, component parameter data type 1107, and component parameter data 1108 are included in the panel information 1101. The component ID information 1104 is identification information indicating what component the customization information is about. In this example, the component ID information 1104 describes that the customization information is about a "title" component. The component setting information 1105 describes setting information about the component. The component parameter information 1106 describes customization information about a parameter of the component. The component parameter data type 1107 describes a data type of the parameter of the component. The component parameter data 1108 describes a setting value of the parameter of the component. When "string" is set to data_type of the component parameter data type 1107, information about a localized character string is specified thereby.

Accordingly, the title component information 1103 describes the "title" component and the "title" parameter, and a localized character string "Custom Application" is set as a setting value of the "title" parameter. Customization information is similarly set with respect to the message component information 1109, the OK button component information 1110, and the cancel button component information 1111.

The information for executing a job is stored in the panel information 1102. In job execution component information 1112, "execute_job" is specified as a component for executing a job 1113. As the information about the job execution component information 1112, parameter setting values such as a job identification ID 1114 which describes a type of a job to be executed and a job parameter 1115 of the job are included in the panel information 1102. FIG. 11 shows a combination of FIGS. 11A and 11B. In FIGS. 11A and 11B, because an application for executing a copy job is illustrated as the example, "copy" is specified in the job identification ID 1114. A parameter applied when that job is executed can be registered in the job parameter 1115. Herein, the number of copies 1116 and a color mode 1117 are registered.

For example, the description described as an example is read by the description reproduction control 609 of the reproduction application. Then, the reproduction application configures a screen according to the description, and shifts a screen or controls execution of a job according to the user operation.

<Installation of Custom Application>

Figure 7B:
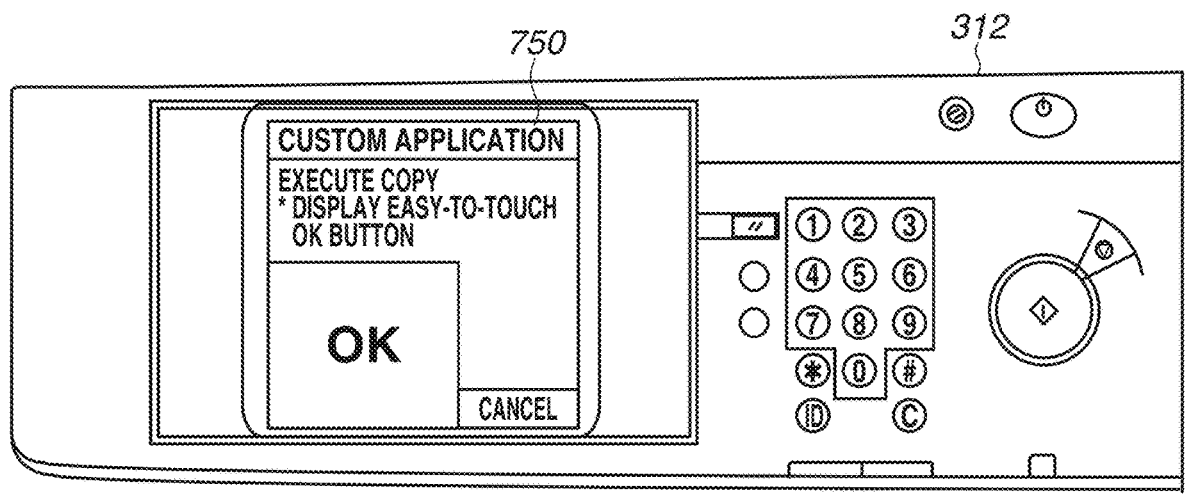
FIG. 7B is a diagram illustrating an execution screen of a custom application displayed on the MFP.

Processing for installing a custom application, executed in step S912 in FIG. 9, will be described in detail. A description registered in the authoring system 0101 is packaged in step S915, provided to the MFP 0203 as a custom application in step S911, and installed in the MFP 0203 in step S912. When the custom application is installed, the reproduction application is executed on the MFP 0203, and the description is read by a script, so that the information specified by the description is reproduced. Then, an execution screen illustrated in FIG. 7B is displayed thereon. FIG. 7B is a diagram illustrating an execution screen of the custom application displayed on the MFP 0203. This execution screen is identical to the execution screen displayed on the display area 701 when the description is edited. This indicates that the custom application operates normally. Hereinafter, processing relating to installation of the custom application will be described in detail.

Figure 10:
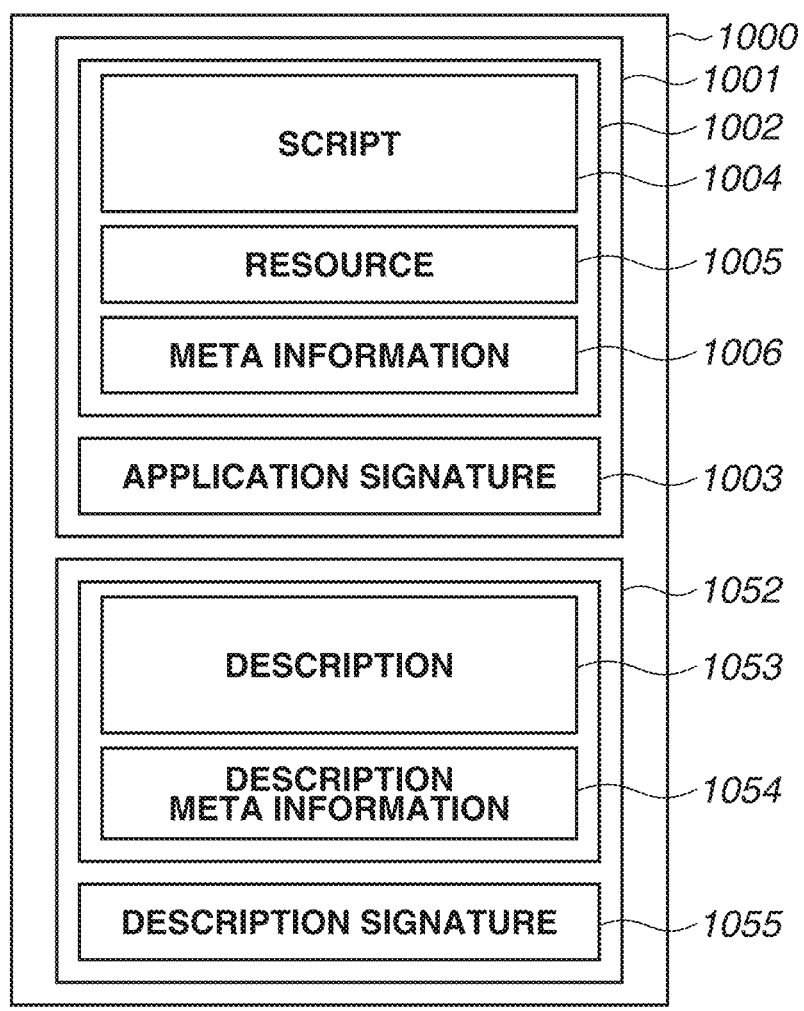
FIG. 10 is a diagram illustrating a data structure of the custom application.

First, a structure of an installation package provided to the MFP 0203 from the authoring system 0101 will be described. FIG. 10 is a diagram illustrating a data structure of the installation package.

An installation package 1000 is package data which includes a signed description 1052 and a signed application 1001.

The signed application 1001 includes a reproduction application 1002 consisting of a script 1004, a resource 1005, and meta information 1006, and an application signature 1003. In the present exemplary embodiment, the reproduction application the same as the reproduction application retained by the description editor 604 is used.

The signed description 1052 consists of a description 1053, a description meta information 1054, and a description signature 1055. The description 1053 is data generated by the description editor 604, which defines behavior of the application customized by the user. Details of the description 1053 has been described in the above with reference to FIGS. 11A and 11B. The description meta information 1054 is information which describes an identifier (description identifier), a version, and an application name of the custom application. The description signature 1055 is signature data which guarantees integrity of the description 1053 and the description meta information 1054. The description signature 1055 is generated by using a signature key different from the signature key used for the application signature 1003. This signature key is retained by the authoring system 0101, and signature data, i.e., the description signature 1055, is generated by the description signature affixation 0211.

Figure 12:
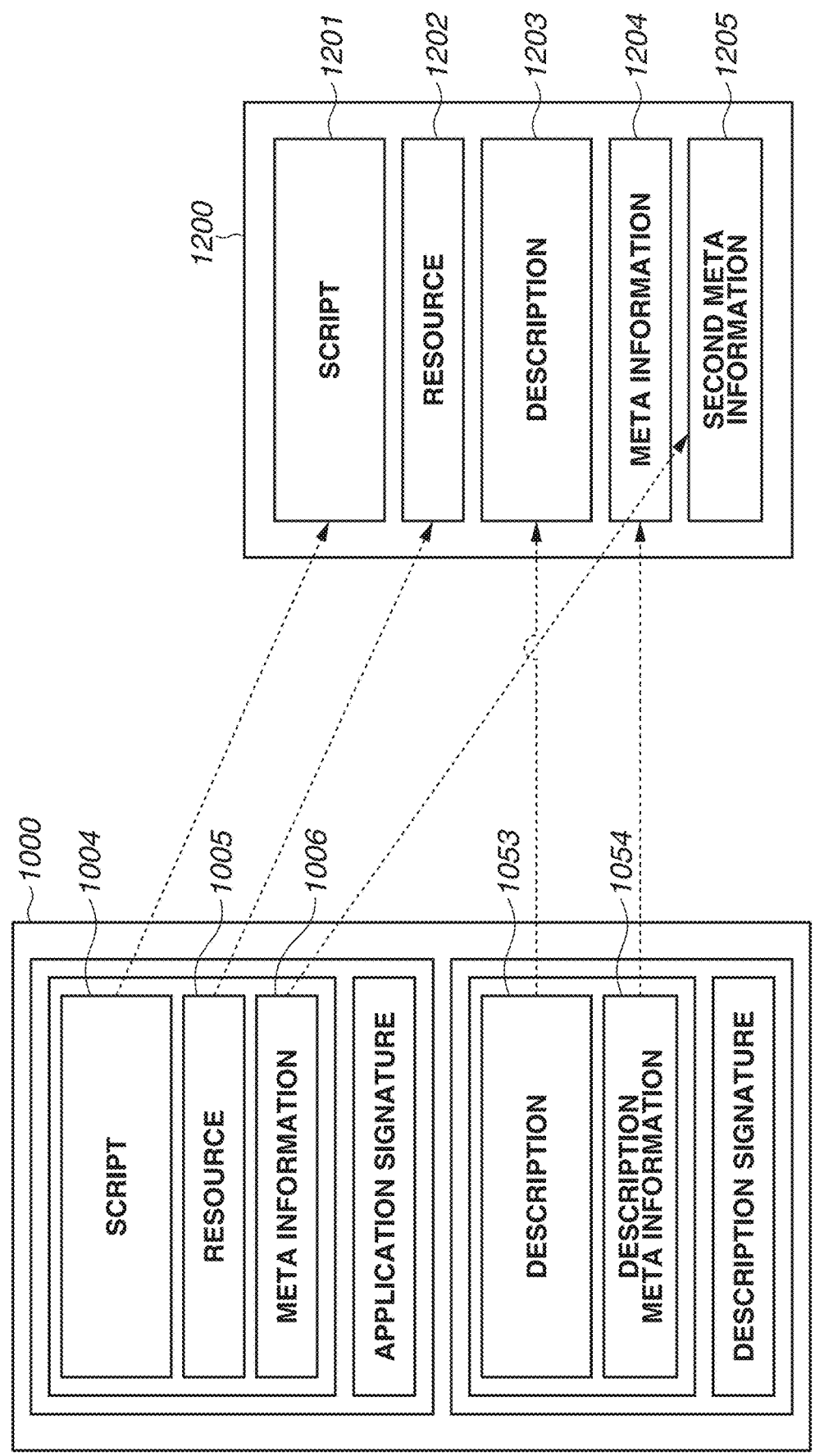
FIG. 12 is a diagram illustrating a structure of the custom application installed in the MFP.

The processing for installing the above-described installation package 1000 in the MFP 0203 will be described in detail. FIG. 12 is a diagram illustrating an application structure retained in the storage of the MFP 0203 after the custom application is installed in the MFP 0203 and an installation package corresponding thereto. An installation package 1000 is illustrated on the left side in FIG. 12, and an installed application 1200 is illustrated on the right side in FIG. 12. A structure of the installation package 1000 has been described as the above. The installed application 1200 consists of a script 1201, a resource 1202, a description 1203, a meta information 1204, and a second meta information 1205. In the installation processing of the application executed by the MFP 0203, data within the installation package 1000 is read out and reconfigured on the storage of the MFP 0203. Specifically, the script 1004 within the installation package 1000 is arranged as the script 1201. The resource 1005 within the installation package 1000 is arranged as the installed resource 1202. Further, the description 1053 within the installation package 1000 is arranged as the installed description 1203.

In addition, the meta information 1204 is stored as the information (identifier) which uniquely identifies the installed application. In other words, the meta information 1204 is used for distinguishing the application from another application installed in the MFP 0203. Moreover, the meta information 1204 is used for specifying the application as a target of version upgrade when a version of the application is upgraded.

Figures 15A, 15B:
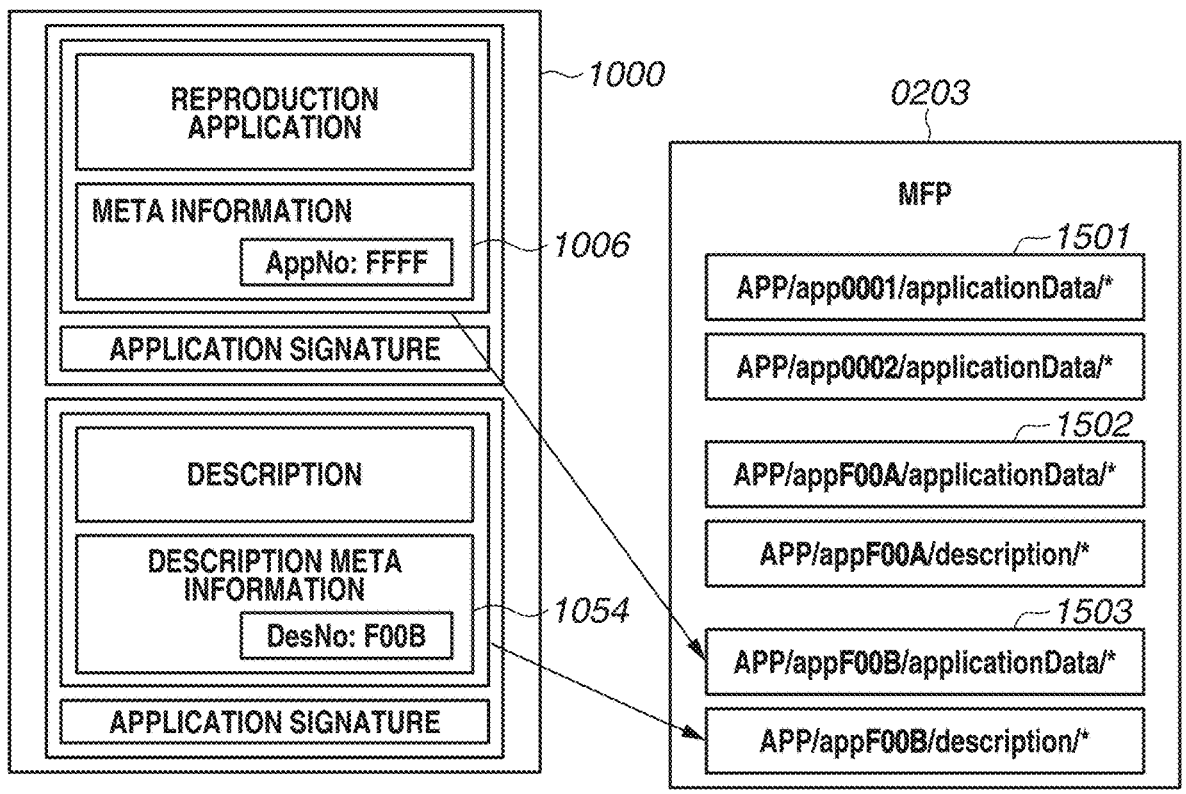
FIG. 15A is a diagram illustrating management of meta data of an application package and application data of the MFP.
FIG. 15B is a table illustrating a correspondence between meta data and data within the MFP.

FIG. 15A is a diagram illustrating management of meta data of the application package and application data of the MFP 0204. FIG. 15B is a table illustrating the correspondence between the meta data and data within the MFP 0203. The MFP 0203 uniquely and identifiably manages each of the applications by retaining data illustrated in FIG. 15B. In a case where a standard application is to be installed, meta information associated with the application within the installation package can be stored as the meta information 1204. In other words, the standard application refers to an application different from the custom application in which a description is combined with a reproduction application. For example, as illustrated in FIG. 15B, applications 1 and 2 respectively retain "AppNo: 0001" and "AppNo: 0002" as the information (application identifier (ID)) described in an application meta data column 1504, so that the applications 1 and 2 can be distinguished from one another. Thus, the applications 1 and 2 can uniquely be identified by storing the application meta data in the meta information 1204.

On the other hand, in a case where a custom application created by the authoring system 0101 is to be installed, the application cannot uniquely be identified by meta information associated with the application. For example, as illustrated in FIG. 15B, both of custom applications A and B retain "AppNo: FFFF" as the information described in the application meta data column 1504. Thus, the custom applications A and B cannot be distinguished from one another. This phenomenon arises because the custom applications A and B use the same reproduction application. Therefore, in the present exemplary embodiment, in a case where the custom application is to be installed, the meta information 1006 of the application stored in the meta information 1204 is rewritten and changed with the description meta information 1054. As illustrated in FIG. 15B, because the custom applications A and B respectively retain "DesNo: F00A" and "DesNo: F00B" as the information described in the description meta data column 1505, the custom applications A and B can be distinguished from one another. Thus, the application meta data written into the meta information 1204 is rewritten and changed with the description meta data. In this way, the custom applications A and B can uniquely be distinguished from one another. Further, in the present exemplary embodiment, as illustrated in the data column 1506 within MFP 0203, the directory of the application is generated based on the information described in the meta information 1204. Thus, the directories of a plurality of applications overlap with each other if the information described in the meta information 1204 of the plurality of applications overlaps with each other. However, because the above-described rewriting processing is executed previously, all of the applications can appropriately be managed with different directories.

Further, when the custom application is to be installed, the meta information 1006 of the application is stored as the second meta information 1205 in addition to the meta information 1204 used as an identifier of the installed application. The meta information 1006 is stored for the purpose of retaining the version information and the application name of the reproduction application.

Next, control processing executed when the application package is installed will be described. FIG. 13 is a flowchart illustrating processing for installing the application package. The processing in FIG. 13 is processing of the application management unit 352. In other words, the processing is implemented by the controller unit 300. More specifically, the CPU 301 loads a program stored in the ROM 303 on the RAM 302 and executes the program to implement the processing.

First, in step S1302, the application management unit 352 transmits an installation request through the use of an optional installation unit.

In a case where installation is started through the use of the custom application distribution system 0213 in step S1311, then in step S1312, the application management unit 352 starts a custom application installer. In step S1313, the application management unit 352 accepts an installation code input by the system user 0202 or a user of the MFP 0203.

This processing corresponds to the processing in step S910. In step S1314, the application management unit 352 transmits an installation request to the custom application distribution system 0213 by using the input installation code. The installation code can be input through the use of an input method using a software keyboard of the operation unit 312, for example. However, the installation code may be input through the use of another method. For example, the user may access the web page provided by the MFP 0203 from an information processing apparatus such as a PC and transmit the content input via a keyboard to the MFP 0203. Alternatively, the user may input the installation code by reading a sheet on which the installation code or information corresponding to the installation code is described through the use of the scanner 370.

When installation of a standard application is started in step S1315, then in step S1316, the application management unit 352 starts an application installer. In step S1317, the application management unit 352 accepts selection of the application to be installed from the user of the MFP 0203. In step S1318, the application management unit 352 transmits an installation request for installing the selected application to the application server.

When installation using a preinstalled application is started in step S1319, then in step S1320, the application management unit 352 executes a pre-installer. In step S1321, the activated pre-installer transmits an installation request to an internal storage. As a response to the installation request transmitted in step S1302, in step S1303, the application management unit 352 receives the installation package of the application. In step S1304, the application management unit 352 determines a configuration of the application included in the received installation package.

If the configuration of the application cannot be determined (FAIL IN DETERMINATION in step S1304), the application management unit 352 determines that installation has failed, and the processing ends with an error.

If the configuration of the application is a standard application (FIRST CONFIGURATION in step S1304), the processing proceeds to step S1305. In step S1305, the application management unit 352 executes verification of the application. In the verification, the application management unit 352 uses the application signature 1003 to check whether unauthorized information is included in the script 1004, the resource 1005, and the meta information 1006 of the application.

If verification has failed (NO in step S1305), the application management unit 352 determines that installation has failed, and the processing ends with an error. If verification has succeeded (YES in step S1305), the processing proceeds to step S1306. In step S1306, the application management unit 352 executes installation of the application.

If the configuration of the application is the application created by the authoring system 0101 (SECOND CONFIGURATION in step S1304), the processing proceeds to step S1307. In step S1307, the application management unit 352 executes verification of the application. In the verification, the application management unit 352 uses the application signature 1003 of the reproduction application to check whether the description 1053 and the description meta information 1054 of the reproduction application are authorized information.

If verification has failed (NO in step S1307), the application management unit 352 determines that installation has failed, and the processing ends with an error. If verification has succeeded (YES in step S1307), the processing proceeds to step S1308. In step S1308, the application management unit 352 uses the description signature 1055 to verify whether unauthorized information is included in the description 1303 and the description meta information 1304. If verification has failed (NO in step S1308), the application management unit 352 determines that installation has failed, and the processing ends with an error. If verification has succeeded (YES in step S1308), the processing proceeds to step S1309. In step S1309, the application management unit 352 executes processing for replacing "AppNo" acquired from the meta data of the reproduction application with "DesNo" described in the meta data of the description. In step S1310, the application management unit 352 executes installation of the reproduction application and the description.

<Remarks>

As described above, the authoring system 0101 provides an environment where the application can easily be edited and distributed. With this configuration, a person in charge such as a service engineer or a technical sales person can create a custom application, so that an application desired by a client can be provided promptly.

Further, the authoring system 0101 manages the information (specifically, an identifier) of the description in addition to the information (specifically, an identifier) of the reproduction application. Therefore, it is possible to appropriately manage the custom applications even if the types of the custom applications are increased in number in proportion to the number of demands of the clients.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-110760, filed Jul. 2, 2021, which is hereby incorporated by reference herein in its entirety.

What is claimed is:

1. An information processing system that manages an application executed by an image processing apparatus with an application identifier, the information processing system comprising:
one or more controllers configured to:
provide combined information of a reproduction application that reproduces a description file for defining operation procedures and a first description file as a first combined application;
provide combined information of the reproduction application and a second description file as a second combined application;
manage a first description identifier corresponding to the first description file and a second description identifier corresponding to the second description file; and
manage the first combined application and the second combined application in a distinguishable manner based on the first description identifier and the second description identifier.

2. The information processing system according to claim 1, wherein the reproduction application included in the first combined application and the reproduction application included in the second combined application are managed with a same application identifier.

3. The information processing system according to claim 1, wherein the first combined application is installed in the image processing apparatus based on package data that includes the reproduction application and the first description file.

4. The information processing system according to claim 3, wherein the image processing apparatus registers the application by using the first description identifier instead of using the application identifier of the reproduction application when installation processing is executed based on the package data.

5. The information processing system according to claim 1, wherein the one or more controllers are further configured to:
create the first description file; and
issue the first description identifier based on a notification of the creation.

6. The information processing system according to claim 5,
wherein the first description file is created by an editing program executed on a web browser of an external terminal, and
wherein the editing program outputs screen information for accepting an editing operation performed by a user.

7. The information processing system according to claim 6, wherein the screen information includes information for checking of operation of an application being edited.

8. The information processing system according to claim 6, wherein the screen information includes information about a component addable to the application being edited.

9. The information processing system according to claim 6, wherein the screen information includes information for editing a display component used for the application being edited.

10. The information processing system according to claim 6, wherein the editing program includes a reproduction program that reproduces the first description file.

11. The information processing system according to claim 10, wherein the reproduction program is based on a language that is same as a language of the reproduction application and different from JavaScript.

12. The information processing system according to claim 11, wherein the reproduction program is a program same as the reproduction application.

13. The information processing system according to claim 11, wherein the language different from JavaScript is a Lua language.

14. The information processing system according to claim 11, wherein the editing program includes an emulator that executes the reproduction program.

15. The information processing system according to claim 1, wherein the first description file is data described in a JavaScript Object Notation (JSON) format.

16. The information processing system according to claim 3, wherein the package data includes information about a version of the reproduction application.

17. The information processing system according to claim 1, wherein the one or more controllers are further configured to manage signature information of the reproduction application and signature information of the first description file.

18. The information processing system according to claim 1, wherein the image processing apparatus includes an image forming device configured to form an image on a sheet.

19. The information processing system according to claim 1, wherein the image processing apparatus includes an image reading device configured to read an image from a document.

20. An information processing apparatus that manages an application executed by an image processing apparatus with an application identifier, the information processing apparatus comprising:

a processor; and a memory containing instructions that, when executed by the processor, cause the processor to perform operations comprising:

providing combined information of a reproduction application that reproduces a description file for defining operation procedures and a first description file as a first combined application;

providing combined information of the reproduction application and a second description file as a second combined application;

managing a first description identifier corresponding to the first description file and a second description identifier corresponding to the second description file; and managing the first combined application and the second combined application in a distinguishable manner based on the first description identifier and the second description identifier.

* * * * *